United States Patent
Healey et al.

(10) Patent No.: US 9,134,955 B2
(45) Date of Patent: Sep. 15, 2015

(54) CUSTOMIZATION OF A VEHICLE

(71) Applicants: Jennifer A Healey, San Jose, CA (US); Alexandra C. Zafiroglu, Portland, OR (US); Victoria S. Fang, Mountain View, CA (US)

(72) Inventors: Jennifer A Healey, San Jose, CA (US); Alexandra C. Zafiroglu, Portland, OR (US); Victoria S. Fang, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 156 days.

(21) Appl. No.: 13/749,327

(22) Filed: Jan. 24, 2013

(65) Prior Publication Data

US 2014/0207338 A1    Jul. 24, 2014

(51) Int. Cl.
*G06F 7/00* (2006.01)
*B60K 35/00* (2006.01)

(52) U.S. Cl.
CPC .. *G06F 7/00* (2013.01); *B60K 35/00* (2013.01)

(58) Field of Classification Search
None
See application file for complete search history.

(56) References Cited

U.S. PATENT DOCUMENTS

| | | | | |
|---|---|---|---|---|
| 5,901,806 A * | 5/1999 | Takahashi | | 180/170 |
| 5,975,728 A * | 11/1999 | Weyer | | 362/489 |
| 6,304,803 B1 * | 10/2001 | Dao | | 701/36 |
| 6,693,523 B1 * | 2/2004 | Abel et al. | | 340/461 |
| 6,897,624 B2 * | 5/2005 | Lys et al. | | 315/297 |
| 7,321,294 B2 * | 1/2008 | Mizumaki | | 340/438 |
| 7,474,947 B2 * | 1/2009 | Furui et al. | | 701/36 |
| 7,642,730 B2 * | 1/2010 | Dowling et al. | | 315/292 |
| 7,840,322 B2 * | 11/2010 | Ross et al. | | 701/36 |
| 7,889,063 B2 | 2/2011 | Rovik et al. | | |
| 7,937,201 B2 * | 5/2011 | Roudeau et al. | | 701/51 |
| 8,521,338 B2 * | 8/2013 | Takeuchi et al. | | 701/1 |
| 8,799,360 B2 * | 8/2014 | Nicholson et al. | | 709/203 |
| 2004/0010358 A1 * | 1/2004 | Oesterling et al. | | 701/49 |
| 2004/0044454 A1 * | 3/2004 | Ross et al. | | 701/33 |
| 2004/0093154 A1 * | 5/2004 | Simonds et al. | | 701/200 |
| 2005/0222726 A1 * | 10/2005 | Furui et al. | | 701/36 |
| 2006/0122750 A1 * | 6/2006 | Choi et al. | | 701/36 |

(Continued)

FOREIGN PATENT DOCUMENTS

JP   2005-067405 A   3/2005
WO   2014/116898 A1  7/2014

OTHER PUBLICATIONS

International Search Report and Written Opinion received for PCT Patent Application No. PCT/US2014/012868, mailed on May 14, 2014, 16 pages.

*Primary Examiner* — Thomas Tarcza
*Assistant Examiner* — Richard Goldman
(74) *Attorney, Agent, or Firm* — Sutherland Asbill & Brennan LLP

(57) ABSTRACT

Devices, systems, and techniques are provided for customization a vehicle and the interior thereof. The customization can be based at least on customization themes associated with an occupant of the vehicle and/or the vehicle. In addition or in the alternative, the customization can be based at least on vehicular context of the occupants and the vehicle. A specific customization can be effected in response to a change in context of vehicle, and thus the vehicle can be dynamically customized in response to a specific vehicular context as the context is realized. The customization themes can integrate with an in-vehicle infotainment (IVI) system and/or one or more of in-cabin lighting, projection or other rendering features, or data streams. Customization can be accomplished via configuration of one or more customization components comprising sensors, rendering units, lighting fixtures, or control components.

40 Claims, 10 Drawing Sheets

(56) References Cited

U.S. PATENT DOCUMENTS

| | | |
|---|---|---|
| 2009/0079555 A1* | 3/2009 | Aguirre De Carcer et al. ............ 340/441 |
| 2010/0161171 A1* | 6/2010 | Valentine et al. ............... 701/33 |
| 2011/0029875 A1 | 2/2011 | Milch |
| 2011/0066324 A1 | 3/2011 | Odland et al. |
| 2012/0046981 A1 | 2/2012 | Wellman |
| 2012/0239265 A1* | 9/2012 | Kato et al. ...................... 701/70 |
| 2012/0271500 A1* | 10/2012 | Tsimhoni et al. ............... 701/23 |
| 2013/0124006 A1* | 5/2013 | Anantha et al. ................... 701/1 |
| 2013/0158847 A1* | 6/2013 | Teteak .......................... 701/119 |
| 2014/0200762 A1* | 7/2014 | Shaw et al. ..................... 701/36 |
| 2014/0207338 A1* | 7/2014 | Healey et al. .................. 701/45 |
| 2014/0249714 A1* | 9/2014 | Gormley ......................... 701/36 |

* cited by examiner

CUSTOMIZATION OF A VEHICLE

BACKGROUND

The desire of individuals to customize the interior space of cars typically is global. Commonly, loved ones are inclined to display concern for and seek connection with car operators and/or car occupants with gifts directed to the car's interior, often with presents focused around safety. Car operators and occupants want to feel a sense of comfort and connection around themselves while on the road. In addition, people want their cars to reflect their personalities and keep them connected to those whom they love.

Creating a theme for the interior of a vehicle (e.g., a car, a yacht, or the like) typically is limited to physical objects that are brought into the interior, including seat covers, steering wheel covers, car carpeting, pillows, stickers, chrome edging, bobble-heads, and so forth. It is also common for people to remain connected to family through physical objects (such as religious and safety talismans, and memorabilia) and by incorporating pictures of a family member onto dashboards or tucking away such pictures in sun shades and other places.

BRIEF SUMMARY

Devices, systems, and techniques are provided for customization a vehicle and the interior thereof. The customization can be based at least on customization themes associated with an occupant of the vehicle and/or the vehicle. In addition or in the alternative, the customization can be based at least on vehicular context of the occupants and the vehicle. A specific customization can be effected in response to a change in context of vehicle, and thus the vehicle can be dynamically customized in response to a specific vehicular context as the context is realized. The customization themes can integrate with an in-vehicle infotainment (IVI) system and/or one or more of in-cabin lighting, projection or other rendering features, or data streams. Customization can be accomplished via configuration of one or more customization components comprising sensors, rendering units, lighting fixtures, or control components.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
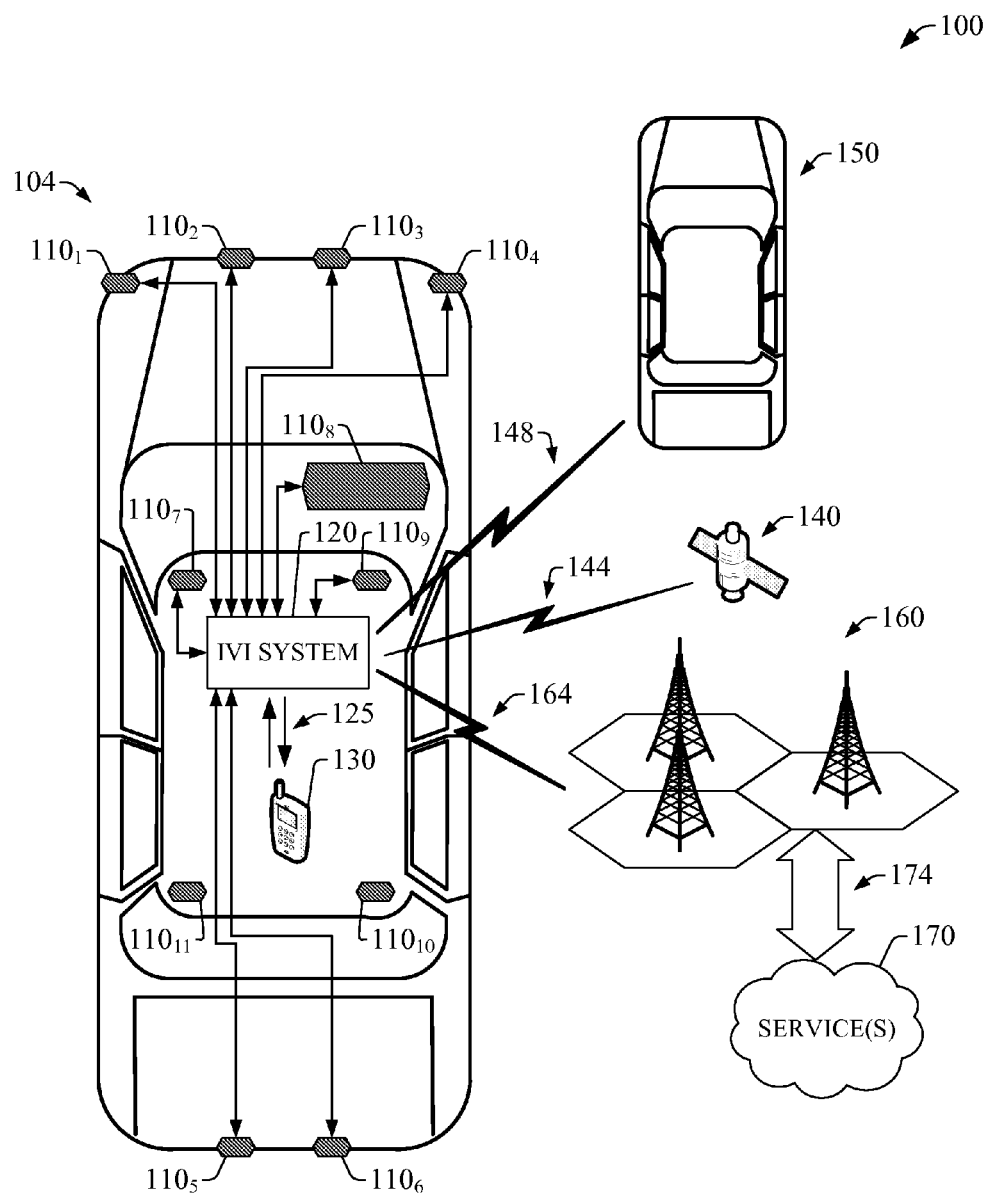
FIGS. 1-2 illustrate an example operational environment in accordance with one or more aspects of the disclosure.

The disclosure recognizes and addresses, in one aspect, the issue of vehicle customization and related customizable in car experiences via "themes." referred to as customization themes. The disclosure provides devices, systems, and techniques for customization of a vehicle and the interior thereof and associated in-cabin experiences. The customization can be based at least on the operator (e.g., a driver, a pilot, etc.) of the vehicle and/or other passengers. In the present disclosure, the operation of a vehicle and the passenger(s) thereof are referred to as "the occupants". In addition or in the alternative, the customization can be based at least on vehicular context (such as time of day, day of week, special occasion, or the like) of the occupants and the vehicle. In certain implementations, a specific customization can be effected in response to a change in the vehicular context of the vehicle. Thus, in such implementations, the vehicle can be dynamically customized in response to specific vehicular context as the context is realized. As described in greater detail below, the customization can be accomplished via customization themes that can integrate with an in-vehicle infotainment (IVI) system and/or one or more customization components, such as in-cabin lighting fixtures, projection devices or other rendering units, information streams, or the like. In one implementation, for example, the customization can utilize digital information, such as content and communications, substantially without or strictly without reliance on adjustment or configuration of analogic components. In such an implementation, the customization can be referred to as a digital customization. Customization themes can define the scope of information (e.g. content, communications, vehicular performance constraints) and source(s) thereof that can be utilized or leveraged to customize a vehicle. Customization themes can comprise, for example, personal themes or corporate themes), wherein personal themes can be authored—e.g., designed, generated, or designed and generated—by an occupant of a vehicle or a third-party, and corporate themes can be authored by a specific organization (e.g., a trucking company, a logistics company, etc.). Specific occupant preferences and/or selections can be contemplated in order to establish a customization theme.

Customization of the vehicle in accordance with a customization theme can leverage customization information from a variety of sources, which can be internal to the vehicle, external to the vehicle, or both. In such implementations, the disclosure can implement secure access to cabin control information, vehicle information, and information originating in networked sources, user equipment, and the like. In one aspect, customization information can be consumed internally and/or transmitted to other devices, vehicles, and/or network elements. In another aspect, customization information can be utilized to configure or otherwise program one or more customization components comprising rendering units, sensors, control components, and/or lighting components. The disclosed customization of the vehicle can permit adjustment of appearance and/or feel in order to permit custom content, services, and/or preferential data display based at least on available context, sensor, and cloud data in accordance with a customization theme.

At least one example advantage of the disclosure over conventional vehicle customization may be the creation of vehicular customizations, such as digital customizations, that can provide a substantially richer, more holistic and connected experience with sources of customization. For instance, implementation of a customization theme can provide information associated with the theme, such as sports information related to a sports theme. Similarly, implementation of a customization theme can cause connectivity with remote relatives, such rendering messages or other content received from a remote relative. At least another example advantage may be the dynamic aspect of digital customizations, which can be implemented in response to a specific context or event, for example. At least yet another advantage may be that a vehicular customization in accordance with one or more aspects of the disclosure, such as digital customization, can permit a vehicle to be re-customized without a need to change or replace some or all physical artifacts that typically are utilized to customize a vehicle.

Referring to the drawings. FIG. 1 illustrates an example operational environment 100 in accordance with one or more aspects of the disclosure. As illustrated, the operational environment 100 includes a vehicle 104 that has a group of customization components $110_1$-$110_{11}$ and an in-vehicle infotainment (IVI) system 120. The group of customization components $110_1$-$110_{11}$ can be deployed (e.g., installed; configured; accepted; installed and accepted; configured and accepted; installed, configured, and accepted; or the like) within the cabin of the vehicle 104 (such as components $110_7$-$110_{11}$) or outside the cabin. A customization component deployed within the cabin can be embodied in or can comprise a surface of the interior (represented by customization component $110_8$, for example) of the vehicle 104 having a configurable functional element, such as electrophoretic ink or an electrochromic element, that permits rendering content at the surface. In addition or in the alternative, a customization component can be embodied in or can comprise a surface onto which content can be rendered (e.g. projected) via another customization component (e.g., an audiovisual projector, or a display unit). The group of customization components $110_1$-$110_{11}$ can be functionally coupled (e.g., communicatively coupled) to the IVI system 120. Such functional coupling can permit exchange of information (e.g., data, metadata, and/or signaling) in digital format and/or analogic format between at least one of the group of customization components and the IVI system 120. For example, the IVI system 120, via one or more components therein, can transmit customization instructions to one or more of the customization components $110_1$-$110_{11}$. In certain scenarios, the customization instructions can be transmitted to a customization component in response to data, metadata, and/or signaling received at the IVI system 120 from such component or any other customization component. In addition or in the alternative, the customization instructions can be transmitted in response to data, metadata, and/or signaling received from a functional element (e.g., a component, a unit, a system, etc.) that is external to the vehicle. Implementation of one or more customization instructions, e.g., execution of the one or more customization instructions by a customization component or a processor therein or functionally coupled thereto, can permit customization of the vehicle. It should be appreciated that, in one aspect, customization of the vehicle in response to certain information received from an internal or external source (e.g., a sensor, a device, a network node, or the like) can permit dynamic customization of the vehicle 104. Dynamic customization can include customization of the vehicle 104 in response to information indicative or representative of a customization criterion being satisfied. A customization criterion can contemplate occurrence of a specific event (e.g. a sports team victory, a job promotion, a birthday, and the like). In addition or in the alternative, a customization criterion can contemplate specific instants, such as time of day, time of week, and the like. Moreover or as another alternative, a customization criterion can contemplate presence of a specific occupant or combination of occupants within the vehicle 104.

Figure 2:
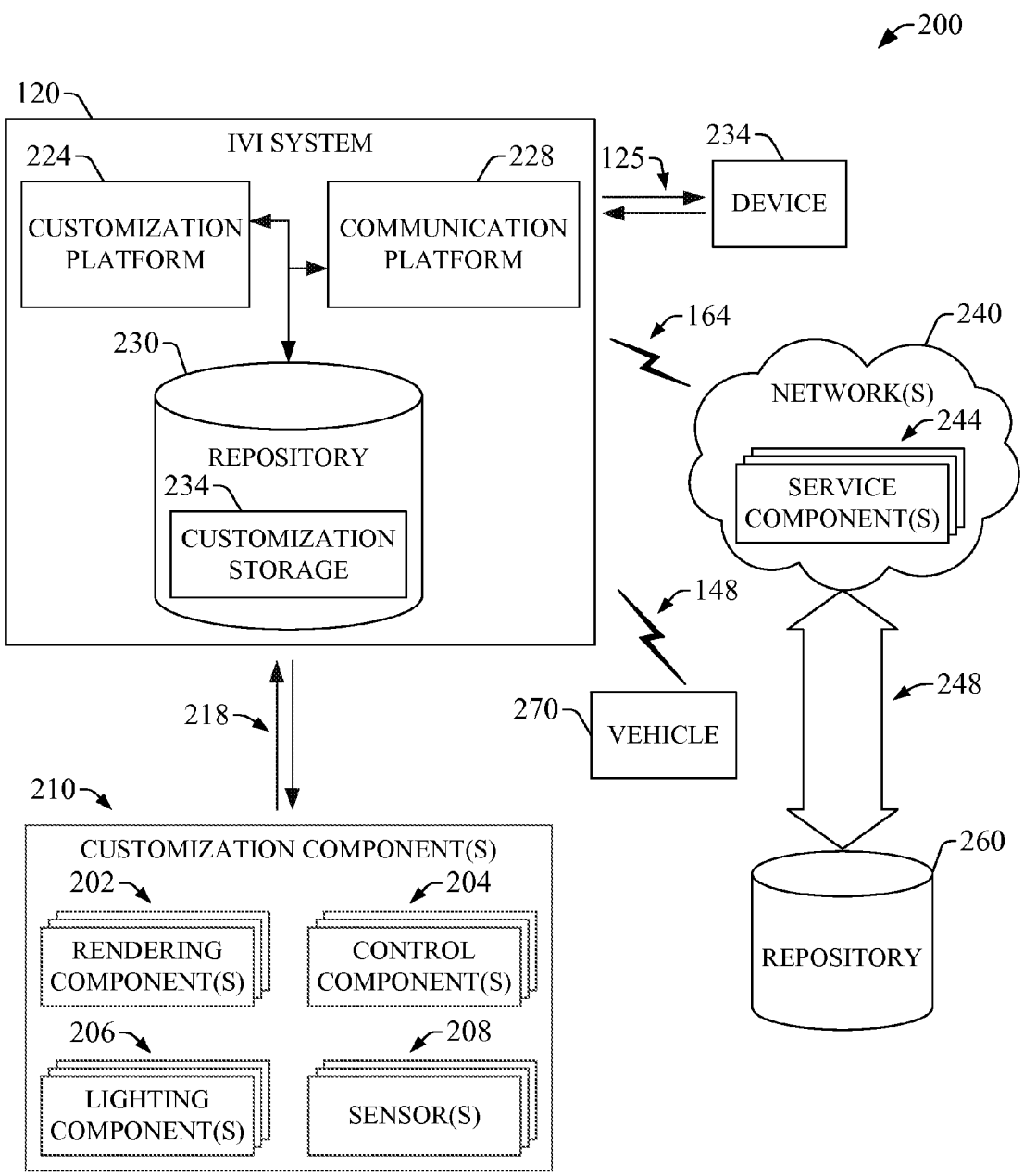

In addition, the group of customization components $110_1$-$110_{11}$ can include at least one rendering component; at least one control component (e.g., one or more electronic control units); at least one lighting component; and/or at least one sensor. In one aspect, a rendering component can be embodied in or can comprise an audio playback unit, an audiovisual projector and/or a display unit (such as a vehicle dashboard, a navigation system display, or any other terminal display within the vehicle 104, or a combination of the foregoing). In another aspect, a lighting component can be embodied in or can comprise a lighting fixture. In yet another aspect, a control component can be embodied in or can comprise a temperature control component, a navigation component, a seat-firmness control component, a speed control component, a speed monitoring component, an acceleration control component, an acceleration monitoring component, a breaking control component, and/or a safety component. In still another aspect, a sensor can be embodied in or can comprise a sonar sensor or a camera (such as a driver-facing camera, a front-facing camera, a rear-view camera, or a blind-spot camera). As illustrated in FIG. 2, in certain scenarios, the group of customization components $110_1$-$110_{11}$ can be referred to as customization component(s) 210, which can include one or more rendering components 202, one or more control components 204, one or more lighting components 206, and one or more sensor(s) 208. The customization component(s) 210 can be functionally coupled to the IVI system 120 via one or more links 218 that can comprise wireless link(s), wireline link(s), or any combination thereof. In certain embodiments, the link(s) 218 can comprise or can be embodied in a vehicle bus, such as a controller area network (CAN) bus (CANbus).

As illustrated in the example operational environment 100, the IVI system 120 can be functionally coupled to a device 130 via link(s) 125. The link(s) 125 can comprise wireless links formed according to a point-to-point or line-of-sight radio technology, such as near field communication (NFC) or Bluetooth. In addition or in the alternative, the IVI system 120 can be functionally coupled to a satellite network 140 via wireless link(s) 144. The satellite network 140 can comprise several satellites and can permit or facilitate the IVI system 120 to acquire content (e.g., audio content and/or video content) or other information specific to a customization theme for customization of the vehicle 104. It should be appreciated that, in certain scenarios, the device 130 can be functionally coupled to the satellite network 140 via a suitable wireless downstream link (DL; not shown). Moreover or as another alternative, the IVI system 120 can be functionally coupled to another vehicle 150 via wireless link(s) 148, which can comprise, for example, a direct short range communications (DSRC) wireless link and/or a radiofrequency (RF) link suitable for communication with radiofrequency identification (RFID) devices (e.g., reprogrammable B-tag devices). The wireless link(s) 148 also can comprise optically switched wireless link(s) (e.g., infrared electromagnetic radiation switching or visible electromagnetic (EM) radiation switching). Such coupling can permit vehicle-to-vehicle (V2V) communication and/or vehicle-to-infrastructure (V2I) communication. Furthermore or as yet another alternative, the IVI system 120 can be functionally coupled to a wireless network 160 via wireless link(s) 164. The wireless network 160 can comprise wireless local area network (WLAN) components and/or wireless wide area network (WWAN) components. It should be appreciated that, in certain scenarios, the wireless network 160 can be embodied in a macro-cellular network. In other scenarios, the wireless network 160 can include a low-power, confined wireless network, such as a femtocell network or a wireless fidelity (Wi-Fi) network. It is contemplated that the wireless network can operate according to most any wireless communication technology, such as Wi-Fi (wireless fidelity), Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. In certain scenarios, the device 130 can be functionally coupled to the IVI system 120 via the wireless network 160.

As illustrated, the functional coupling to the wireless network 160 can permit the IVI system 120 to access (e.g., retrieve or otherwise acquire) information, such as content from one or more services 170, which can be deployed in the cloud—e.g., distributed or federated services accessible via a WAN, such as the wireless network 160. As illustrated, the service(s) 170 can be accessed, at least in part, via traffic and signaling pipe(s) 174, which can comprise wireline link(s) and/or wireless link(s) and several network elements (such as routers or switches, concentrators, servers, and the like). The content can comprise one or more media assets (audio segments, motion-picture segments, non-motion-picture segments, or the like).

It can be appreciated that the IVI system 120 may be pervasively coupled to various sources—which can be internal or external to the vehicle 104—and can access a plethora of information from such sources. Such information can be leveraged to customize the interior of the vehicle 104, for example, in accordance with a specific customization theme. In certain scenarios, information that is acquired from an internal source (e.g., at least one sensor) can be transmitted, e.g. broadcasted, unicasted, or multi-casted, to another vehicle and/or to a network element. In one aspect, execution of one or more customization instructions can permit or facilitate consumption and/or transmission of such information. For instance, in one scenario, at least one of the customization components $110_1$-$110_{11}$ can render a portion of information that is accessed from a source, such as another vehicle, a device, certain infrastructure, a content service, or the like. The information that is accessed by the IVI system 120 can be retained in the IVI system 120 for a predetermined period or substantially permanently.

In certain embodiments, such as example embodiment 200 shown in FIG. 2, the IVI system 120 can comprise a customization platform 224 that permits personal customization of a vehicle containing the IVI system 120. The customization platform 224 can access (e.g., receive or otherwise acquire) theme information indicative of a customization theme (e.g. personal theme, a corporate theme, or the like) associated with an occupant of the vehicle (e.g., the operator or a passenger). As described herein, the customization theme can be authored by an occupant of a vehicle or a third party (such as theme developers or vendors) or an organization. Accordingly, in one aspect, the scope of the customization theme can be unconstrained and can comprise any information (e.g. content) devised by an author (e.g., an occupant of a car, a vendor, an organization, or the like) of the customization theme. As an illustration, the customization theme can be or can comprise a gaming theme, a shopping theme, a recreational theme (such as a holiday or seasonal theme, a sports theme, an adventure theme), a family theme, a business theme, a nature theme, a religious theme, any combination thereof, or the like. It should be appreciated that, in one aspect, a corporate theme can differ from a personal theme in that an organization or corporation can define the corporate theme for vehicles that are part of a corporate fleet or that are utilized for conducting business of the organization or corporation. In one aspect, the customization platform 224 can access at least a portion of the theme information from a customization storage 234 contained in a repository 230 and/or repository 260. It should be appreciated that the repository 260 can contain theme information and/or information suitable for generation of theme information. The customization storage 234 can comprise one or more of customization data, metadata, and/or signaling. The signaling can be embodied in or can comprise machine-accessible instructions (e.g. machine-readable and/or machine-executable instructions). In another aspect, the customization platform 224 can access theme information from a device 234, at least one service component of a group of one or more service components 244, and/or a vehicle 270. Specific customization features associated with the theme information can dictate a specific source to be accessed in order to obtain at least a portion of such information. For example, in a gaming theme, gamer updates can be accessed from at least one of the service component(s) 244. For another example, in a "pet" theme, information indicative of events related to a preferred pet (e.g., a cat) can be accessed. In addition, at least a portion of such information can be rendered as part of a vehicular customization, as shown in element 510 in FIG. 5A. In one implementation, the customization platform 224 can register the IVI system 120 with such service component and can receive content (e.g., audio segments, video segments, non-motion-picture assets, or the like) or other information, such as messages (e.g., multimedia message service (MMS) communications, short message service (SMS) communications, email communications, combinations thereof, or the like). For yet another example, in a recreational theme that incorporates navigation aspects, such as identification of a location, the customization platform 224 can access a service component associated with a location service in order to access location information and/or route information. The customization platform 224 can access tagged locations and/or untagged locations. In one aspect, access to a tagged location can permit or facilitate identification of a local landmark associated with a personal theme or any other theme (e.g., a corporate theme) for vehicular customization. For instance, in a scenario in which a theme for vehicle customization comprises an "antiquing" them or a sports theme, a tagged location can be associated with an antique shop or a home of a sports celebrity can be rendered in the customized vehicle's navigational prevue (see, for example, element 560c in FIG. 5B).

In one embodiment, the customization platform 224 can infer that certain content is desirable or otherwise applicable to a customization theme and, in response, the customization platform 224 can subscribe to a content service (e.g. one or more of service component(s) 244) that can provide the content that is inferred. Such content can be retained in the repository 260, which can be accessed, by at least one of the service component(s) 244, via the traffic and signaling pipe 248, which can comprise wireline link(s) and/or wireless link(s) and several network elements (such as routers or switches, concentrators, servers, and the like). In one aspect, the customization platform 224 can utilize artificial intelligence techniques at least to make an inference regarding desirable content, e.g., draw a conclusion about current or future content that is pertinent to a customization theme based at least on existing information about the customization theme or a vehicular context associated with the customization theme. Artificial intelligence (AI) techniques can be utilized to identify a specific context or action, or to generate a probability distribution of specific states of a system without human intervention. In certain implementations, the artificial intelligence can comprise advanced mathematical algorithms—e.g., decision trees, neural networks, regression analysis, cluster analysis, genetic algorithm, and reinforced learning—that can be applied to specific information associated with an operational environment, such as a system or a platform. In connection with inferring content pertinent to a customization theme in accordance with aspects of the disclosure, the customization platform 224 can utilize at least one of numerous methodologies for learning from information (e.g., data and/or metadata) and then generate inferences from the models so constructed, e.g., Hidden Markov Models (HMMs) and related prototypical dependency models; more general probabilistic graphical models, such as Bayesian networks created by structure search using a Bayesian model score or approximation; linear classifiers, such as support vector machines (SVMs); non-linear classifiers, such as methods referred to as "neural network" methodologies, fuzzy logic methodologies; and the like.

In one implementation, the customization platform 224 can access any theme information securely. Accessing the information securely can permit to preserve the integrity of the operated vehicle (e.g., vehicle 104) and the integrity of a customized vehicle cabin. In order to access information securely, in one embodiment (example embodiment 300 shown in FIG. 3), the customization platform 224 can include a utility component 330 that can implement a firewall or other mechanisms for secure access of digital information. In a firmware embodiment, the utility component 330 can execute a group of computer-executable instructions retained within such component and, in response, the utility component 330 can prevent access to certain information in accordance with an information restriction criterion. In a software embodiment, the utility component 330 can be embodied in a group of computer-executable instructions and can be retained in a memory. A processor can execute such instructions and, in response, a firewall can be implemented at the IVI system 120. In one aspect, the utility component 330 can regulate (e.g., authorize or decline) access to certain information or to certain sources of information. For instance, the utility component 330 can manage secure access to one or more of the customization components 210, e.g. the utility component 330 can manage access to sensor(s) 208 or a hook thereto, to control component(s) 204, to rendering component(s) 202, and/or lighting component(s) 206. In another aspect, the utility component 330 also can regulate access to other IVI systems, other devices, and/or networked service components. It should be appreciated that, in one aspect, such secure access functionality for a customization theme can isolate malware that may be injected into the customization information associated with a customization theme, and thus can prevent the malware from infiltrating into a safety system or any other critical component of a vehicle that is customized according to the customization theme. In addition or in the alternative, the secure access functionality can protect or otherwise ensure the integrity (e.g., safety) of personal data incorporated into the customization theme.

It should be appreciated that, in one aspect, secured access to an information source can permit safe access to peer-generated content, such as personalized messages, images, or other personalized digital objects that can be accessed at the customization platform 224. It should further be appreciated that personalized content can provide a sense of warmth and be an expression of concern from remote loved ones. Driving generally is inherently dangerous and being surrounded with a sense of the familiar and especially the familiar that one can control may enhance a feeling of safety and security. For instance, personalized messages from loved ones or digital icons that have been gifted to express concern, love, and/or caring can create a feeling of proximity or personal connection to a remote person associated with the personalized content. Such sense of connection can be enhanced in scenarios in which the personalized content can be dynamically updated with information about the remote person, such as a reminder that it is their birthday or anniversary.

Figure 3:
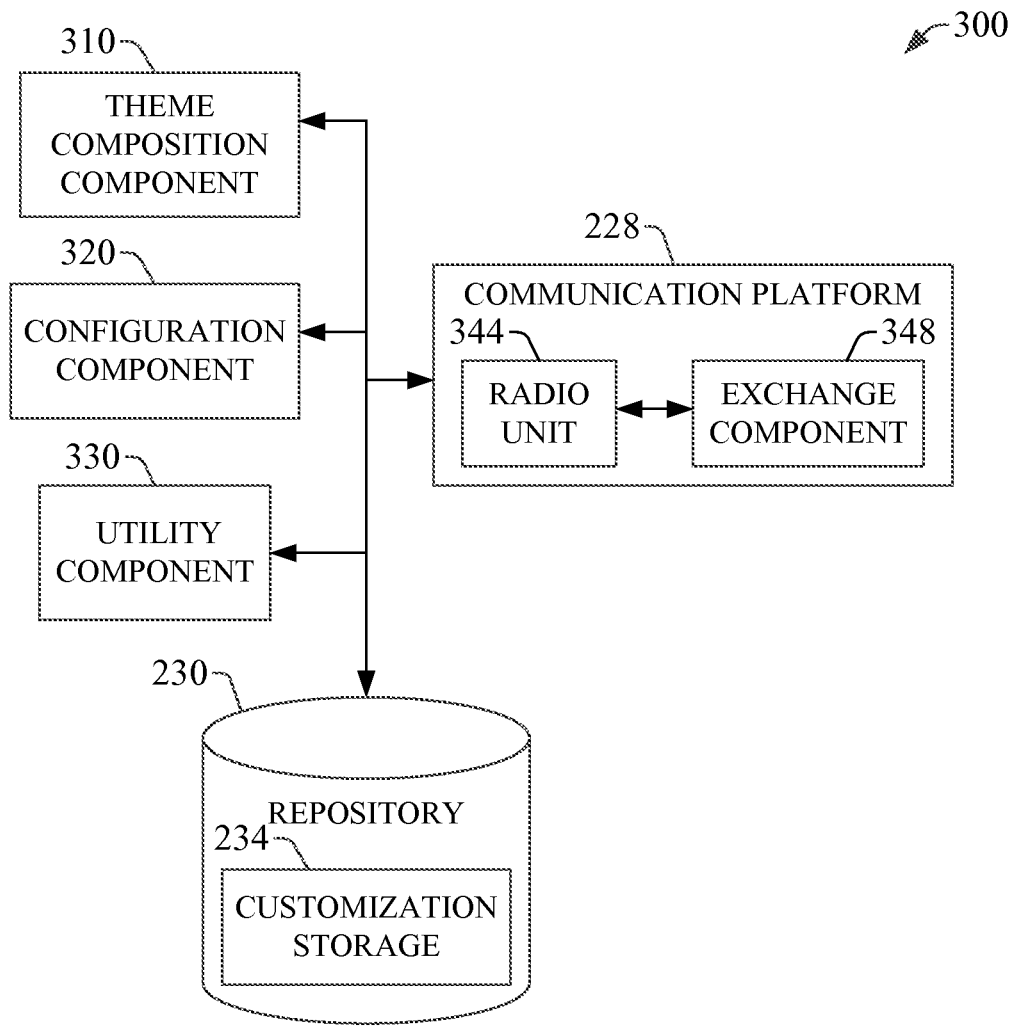
FIG. 3 illustrates an example system in accordance with one or more aspects of the disclosure.
Figure 4:
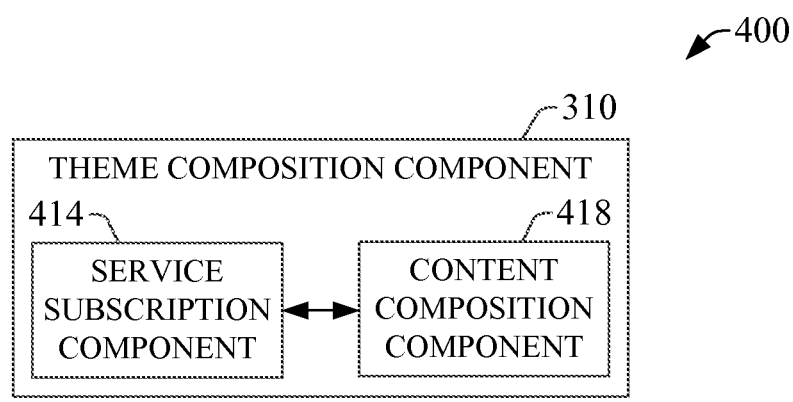
FIG. 4 illustrates an example component in accordance with one or more aspects of the disclosure.

In certain embodiments, e.g., example embodiment 300 shown in FIG. 3, the customization platform 224 can include a theme composition component 310 that can generate customization information indicative of a feature of the customization theme based on at least a portion of the theme information that is accessed. The customization information can be generated in digital format or in analogic format. As described herein, in one aspect, the theme composition component 310 can subscribe (e.g., register) to a content service in order to acquire at least a portion of the information indicative of the feature. In response to the subscription, the theme composition component 310 can receive at least the portion of the information. In one embodiment, e.g., example embodiment 400 illustrated in FIG. 4, the theme composition component 310 can comprise a service subscription component 414 that can subscribe the customization platform 224 to the content service. To at least such end, credentials (a username, an identifying code, a password, a token, and the like) can be communicated to a service component of the one or more service components 244 via the wireless link(s) 164 and through the network(s) 240. At least one of the service component(s) 244 can analyze one or more of the credentials and, in response to the credentials being valid or otherwise acceptable, the at least one of the service component(s) 244 can authorize the customization platform 224, and thus the IVI system 120, to access content associated with the content service.

Figure 5A:
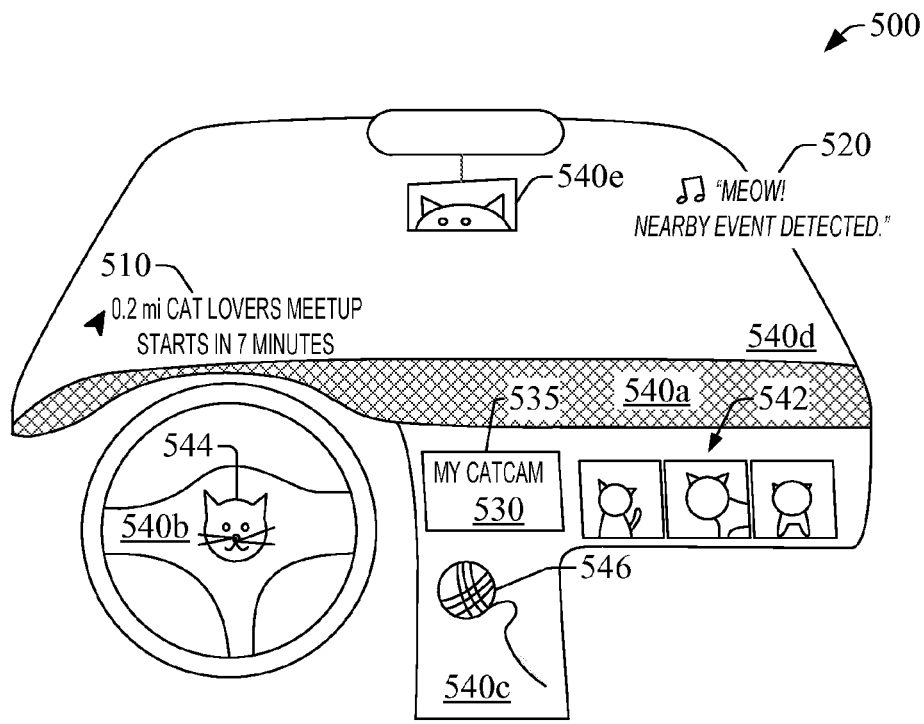
FIGS. 5A-5B illustrate example vehicle customizations in accordance with one or more aspects of the disclosure.

In one aspect, a feature of the customization theme can permit composition and implementation of the customization theme. The feature can comprise one or more of an image, a video segment, an audio segment (such as sound), a video stream, a type of communication, a location, an illumination level and/or a color, specific functionality, or the like. For example, element 520 in FIG. 5A represents an audio feature of an example customization theme, whereas element 540 represents a content feature (e.g. a video feed or video stream) of the example customization theme. In one aspect, the feature can comprise one or more features associated with one or more theme categories. As an example, a theme category can be embodied in or can comprise a feature of a recreational category (e.g. location of an ethnic food restaurant), a feature of an educational category (e.g., literary content), or a feature of an administrative category (e.g., a calendar of an occupant of the vehicle 104). It should be appreciated that the recreational category can comprise one or more of a gaming category, a shopping category, a dining category, a music-venue category, or an arts category. In another aspect, the administrative category can comprise a scheduling category. It should be appreciated that the feature of the customization theme is not restricted to being a feature of the foregoing categories, and substantially any theme category that can be devised by a vehicle occupant or a third-party theme developer is contemplated in the disclosure.

The customization platform 224 can process customization information that is accessed from the repository 230 or from any other source, such as external sources or internal sources (e.g., such as sensor(s) 208). In one aspect, the customization platform 224 can convert information accessed in analogic format into information in digital format. More complex processing also can be implemented. For instance, in one embodiment, the theme composition component 310 can generate a satisfactory route from a current location of the vehicle to a location associated with a customization theme. For example, in a recreational theme, the location associated with the customization theme can be the location of a restaurant, a discounted clothing store, a social network event (e.g., a MeetUp event), or the like.

As illustrated in embodiment 300, the customization platform 224 can include a configuration component 320 that can configure or otherwise program one or more vehicle components in order to supply at least a portion of customization information that is accessed at the customization platform 224. Supplying such information can transform the interior of the vehicle that contains the IVI system 120 described herein. Such a transformation can customize the vehicle in accordance with the customization theme associated with the customization information, and thus the transformation can be referred to as vehicular customization. The vehicular customization can comprise specific configuration of digital information, such as content. In such scenario the vehicular customization can be referred to as digital customization. In addition or in the alternative, the vehicular customization can include configuration of analogic information that permit adjustment of certain performance aspects of the vehicle.

In one aspect, the configuration component 320 can configure or otherwise program at least one of the customization component(s) 210 in accordance with at least a portion of the customization information. For instance, the configuration component 320 can configure one or more of an audio component, a display component, an audiovisual projector, a temperature control component, a navigation component, a lighting fixture, a seat-firmness control component, a speed control component, a speed monitoring component, an acceleration control component, an acceleration monitoring component, a breaking control component, or a safety component. As described herein, in certain embodiments, the display component can be embodied in or can include a surface having electrophoretic ink or another reconfigurable rendering element (e.g. an electrochromic element) that permits rendering content at onto the surface. The surface can be located in the interior of the vehicle or the exterior thereof. In another aspect, the configuration component 320 can transmit one or more machine-accessible instructions to a vehicle component that, in response to execution, the instructions cause the vehicle component (e.g., a sensor, an actuator, a control component) to restrain at least one of speed of the vehicle, acceleration of the vehicle, or an inter-vehicle distance associated with the vehicle according at least in part to the portion of the customization information. It should be appreciated that, in one aspect, such restriction can pertain to a theme of safety for a student driver or an inexperienced driver.

In one aspect, in response to operation of a vehicle component that is configured or otherwise programmed by the configuration component 320, the vehicle component can supply at least a portion of the customization information and/or content generated based at least on such information.

In certain embodiments, e.g., example embodiment 400, the theme composition component 310 can include a content composition component 418 that can generate content based at least on customization information accessed by the customization platform 224. The vehicle component can be or can comprise one or more of the customization components 210. Supplying at least the portion of the customization information and/or the content generated based at least on such information can customize the vehicle that contains the IVI system 120 (e.g., vehicle 104) according to a customization theme (e.g., a personal theme or a corporate theme) associated with the customization information. For example, operation of an audiovisual projector located in the interior of the vehicle (for example, attached to the ceiling) can project specific content generated based at least on the customization information onto a surface of the vehicle. As an illustration, elements 510 and 570, respectively, convey an update message and a navigation message both rendered onto a portion of the windshield of a customized vehicle, whereas element 580 conveys a topic update associated with a customization theme. For another example, actuating a display component, such as a surface having electrophoretic ink (also referred to as e-ink), can render at least the portion of the customization information and/or content based at least on such information. For yet another example, the vehicle component can be or can comprise a rendering unit (e.g., a dashboard display), and the vehicle component can render at least the portion of the customization information. For still another example, the vehicle component can render information indicative of a threshold that restrains at least one of speed of the vehicle, acceleration of the vehicle, or an inter-vehicle distance associated with the vehicle according at least in part to the portion of the customization information. It should be appreciated that, in certain implementations, the communication platform 228 can transmit to other functional elements (e.g., components, units, systems, network nodes), at least certain portions of the customization information associated with a customization theme. To at least such end, in certain embodiments, the communication platform can comprise a radio unit 344 and an exchange component 348. In one aspect, the radio unit 344 can permit wireless communication (e.g., transmission, reception, transmission and reception) of information in accordance with aspects described herein. Such information can be communicated within a vehicle (e.g., vehicle 104) and/or outside the vehicle. Communication within the vehicle can comprise exchange of information between the IVI system 120 and at least one of the customization component(s) 210. In another aspect, the exchange component 348 can permit exchange of information (e.g. data, metadata, and/or signaling) at least among the IVI system 120 and one or more of the customization component(s) 210.

From at least the foregoing examples it is readily apparent that the vehicular customization described herein can be reconfigurable and can be adjusted in response to specific context (such as time of day, day of week, special occasion, occupant(s) presence and/or configuration, or the like) of the vehicle containing the IVI system 120 described herein. Accordingly, the disclosed vehicular customization can provide a richly tailored vehicle customization that can be dynamically adapted to context of the vehicle. As described herein, such dynamic adaptation can permit, for example, the interior of a vehicle to be changed based at least on the operator (or driver), a specific composition of the occupants (e.g., parents and child(ren), husband and wife, father and son, father and daughter, and the like), time of day, and/or due to some special event. As an illustration, in a scenario in which a vehicle is shared between a couple with children, one spouse may have one group of theme preferences (e.g. business, baseball, etc.), the other spouse may have a different group of theme preferences (e.g. biking, nature, politics, etc.), and both spouses as a couple may have a "couples theme" or "beach theme", and a child-favorite theme (e.g., Pokemon, Dora the Explorer, The Avengers, or the like) when both spouse occupy the vehicle in conjunction with the children. In an additional aspect, in view that the vehicular customization relies on customization information and configuration of various customization components, a vehicle can be re-customized without or substantially without implementing changes to an extant arrangement of physical customization artifacts that are generally present in the vehicle.

Figure 5B:
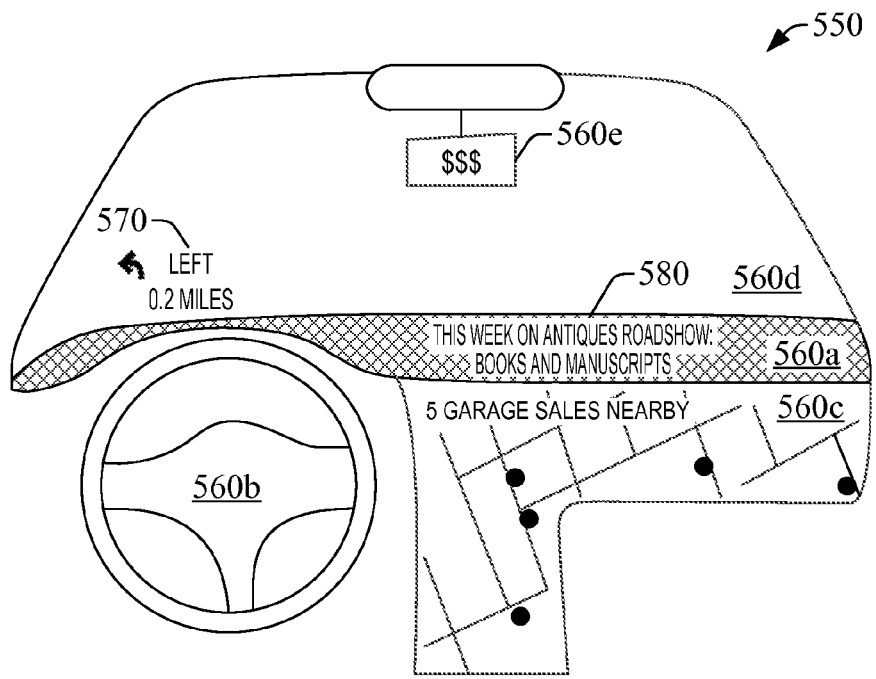
Figure 6:
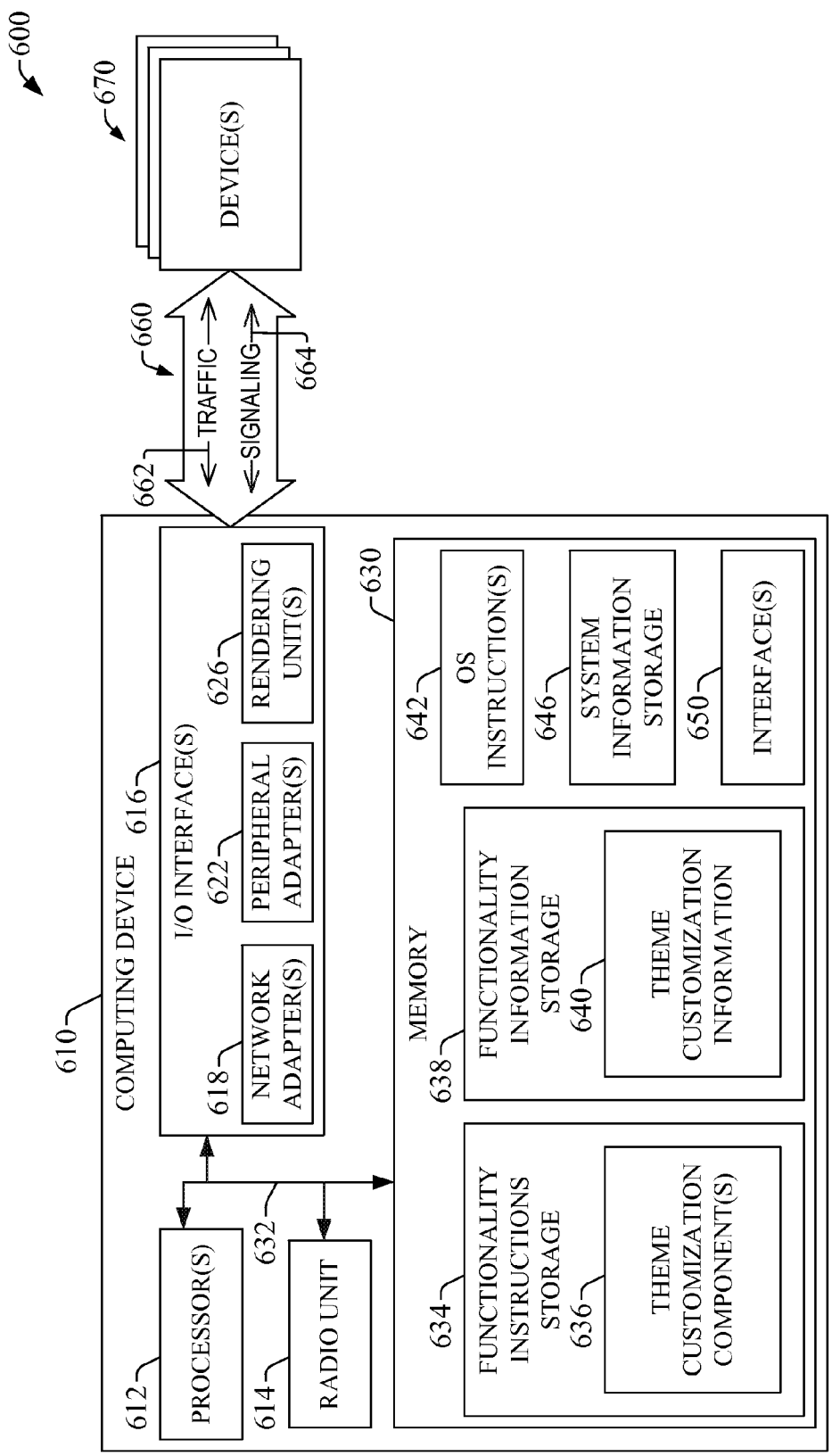
FIGS. 6-9 illustrate various example operational environments in accordance with one or more aspects of the disclosure.
Figure 7:
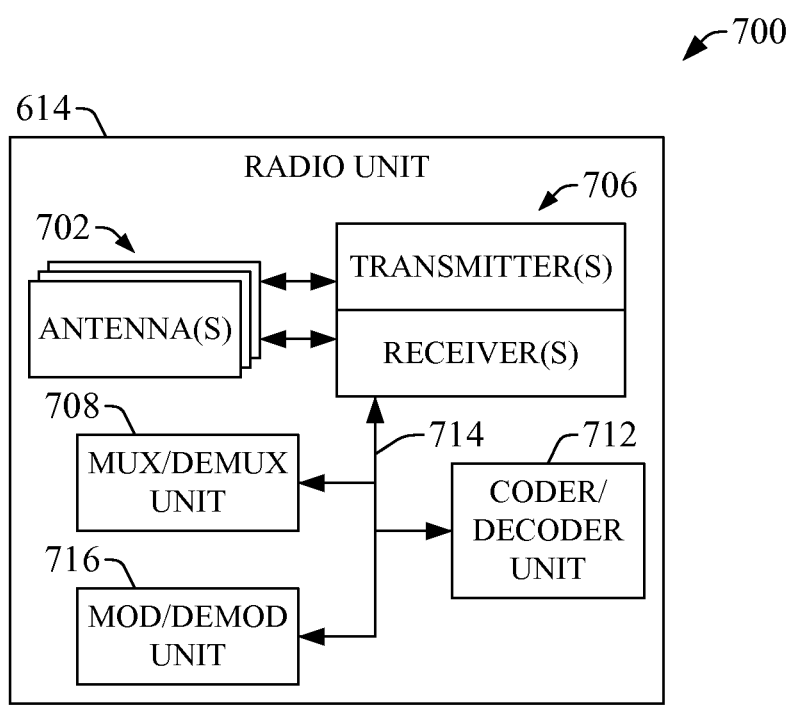
Figure 8:
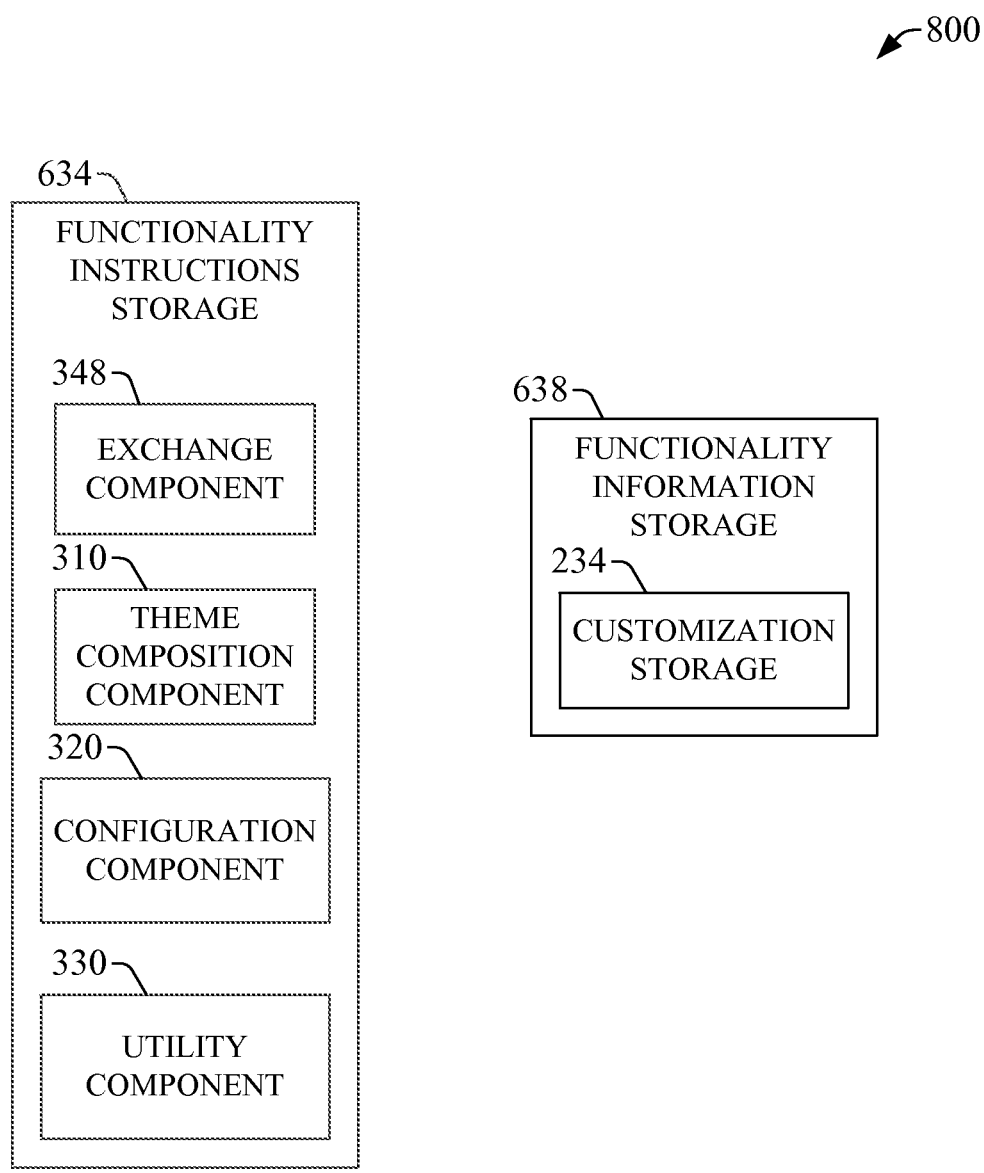

FIGS. 5A-5B present, respectively, diagrams 500 and 550 of example customizations in accordance with one or more aspects described herein. In diagram 500, at least a portion of each of the five surfaces 540a-540e can be customized in accordance with the vehicular customization described herein. Such surfaces can be included in a group of customization components (e.g. customization components $110_1$-$110_{11}$) associated with a vehicle that is customized. In addition, the surfaces 540a-540e can form at least a portion of the customizable real state of the vehicle that is customized. As described herein, one or more of such surfaces can be customized by projecting content (e.g., images, either in motion-picture format or non-motion-picture format) thereon. In such a scenario, the one or more surfaces can be referred to as passive customizable component(s). In addition or in the alternative, as described herein, one or more of such surfaces can comprise electronic paper that can render configurable (or customizable) content via electrophoretic ink (e-ink). As illustrated, one or more of such surfaces can span the area surrounding other customization components, such as display unit 535, which can render content in an area 530. Such content can be associated with a customization theme. In diagram 500, the customization theme can be a "pet" theme, and the content can include images of a pet, such as indicia 542 and 544, or indicia representative of the pet, such as an image 546 of a pet's toy.

Similarly, diagram 550 presents a group of customizable surfaces 560a-560e that can be included in a set of customization components for a vehicle that is customized in accordance with the illustrated theme, which can be an "antiquing" theme. It should be appreciated that such customizable surfaces can comprise or can be the same as respective customizable surfaces 540a-540e. In such a scenario, diagrams 500 and 550 can represent the transition between vehicular customizations that is afforded by the disclosure, wherein the customization illustrated in diagram 500 can be switched to the customization illustrated in diagram 550 without changes in physical structure or arrangement of physical artifacts.

From at least the foregoing description of vehicle customization features according to the present disclosure, rich illustrative customization themes emerge. These customization themes, when implemented in accordance with the various aspects and features described herein, can provide a rich in-cabin customization, for example. Such customization can provide a sense of individuality and can be largely aligned with the emotional state (also referred to as mood) of the driver, with the ensuing increased satisfaction that may be derived from operation of the customized vehicle. For example, one personal theme can be a "Mario Kart" theme. Such a theme can permit Nintendo's Mario Kart styling to be pervasive across the vehicle cabin and various equipment (e.g., present IVI system). In addition, incoming information (via SMS communications, MMS communications, sounds, and/or graphics) can provide gamer updates from Nintendo or another content source. Moreover or as another alternative, other Mario Kart fans who may be present in other vehicles can be identified. For another example, another theme can be "It's Friday after work." This personal theme can open up party floodgates and can set the mood in the vehicle cabin. In response to implementation of such a theme, the floor, mirrors, and lighting of the customized vehicle can be configured to a theme of openness and freedom. Implementation of the customization can utilize or otherwise leverage the capability of a customization platform (e.g., platform 224) to detect time, data, and/or a tagged location (e.g., workplace location) to initiate customization according to the theme. It should be appreciated that this theme may surprise and delight tired workers with the promise of the weekend. As described herein, trusted others may engage in the theme to surprise the driver and/or other occupants. For yet another example, a personal theme can be an "Antiquing" theme, which can be based on known driver preferences, and can assist the driver with finding antiques by leveraging context, such as location, calendar availability, and publicly tagged stops (e.g. "Maggie's Antiques") and/or routes. For still another example, a "Garage Sale Finder" theme can be implemented. In this theme, time sensitive public information (e.g., data and/or metadata) can be utilized to direct a vehicle to normally "untagged" locations, to prepare satisfactory (e.g., optimized or nearly-optimized) routes based at least on available sales, times, and driver preferences. Customization information can permit configuring an interior theme of "bargain hunting" in order to set the mood of the vehicle occupant(s), for example, by providing a tally of garage sales visited and/or a real-time leaderboard of the top garage sale hunters.

Other themes, such as sports themes (e.g., "Manchester United" theme) or holiday-specific themes, can be implemented in accordance with the disclosure. In view of the rich information that can be accessed for customization in accordance with a personal theme or any other type of theme for customization of a vehicle, the customization can be responsive to vehicular context information (e.g., vehicle situation and/or occupant state), occupant condition, occupant preference, local events and location, or the like.

FIGS. 6-9 illustrate block diagrams of example operational environments for context-rich communication between a vehicle and a device in accordance with one or more aspects of the disclosure. These example operational environments are only illustrative and are not intended to suggest or otherwise convey any limitation as to the scope of use or functionality of the operating environments' architecture. In addition, the operational environments should not be interpreted as having any dependency or requirement relating to any one or combination of components illustrated in these example operational environments. These operational environments can embody or can comprise the IVI system 120, the IVI system 120 and another IVI system in another vehicle, or the IVI system 120 and device 130.

The operational environment 600 represents an example software implementation of the various aspects or features of the disclosure in which the processing or execution of operations described in connection with customization of a vehicle can be performed in response to execution of one or more software components at the computing device 610. It should be appreciated that the one or more software components can render the computing device 610, or any other computing device that contains such components, a particular machine for customization of a vehicle as described herein, among other functional purposes. A software component can be embodied in or can comprise one or more computer-accessible instructions, e.g., computer-readable and/or computer-executable instructions. In one scenario, at least a portion of the computer-accessible instructions can embody one or more of the example methods presented in FIGS. 10-11 and various call flows described herein. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 610 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 610 or functionally coupled thereto.

The various example embodiments of the disclosure can be operational with numerous general purpose or special purpose computing system environments or configurations. Examples of well-known computing systems, environments, and/or configurations that can be suitable for implementation of various aspects or features of the disclosure in connection with customization of a vehicle can comprise personal computers; server computers; laptop devices; handheld computing devices, such as mobile tablets; wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 610 can comprise one or more processors 612, a radio unit 614, one or more input/output (I/O) interfaces 616, a memory 630, and a bus architecture 632 (also termed bus 632) that functionally couples various functional elements of the computing device 610. The bus 632 can include at least one of a system bus, a memory bus, an address bus, or a message bus, and can permit exchange of information (data, metadata, and/or signaling) between the processor(s) 612, the I/O interface(s) 616, and/or the memory 630, or respective functional element therein. In certain scenarios, the bus 632 in conjunction with one or more internal programming interfaces 650 (also referred to as interface(s) 650) can permit such exchange of information. The internal programming interfaces 650 can embody one or more application programming interfaces (APIs) and, in response to execution by a processor, can permit exchange of information between different portions of the one or more theme customization component(s) 636. In scenarios in which processor(s) 612 include multiple processors, the computing device 610 can utilize parallel computing.

The I/O interface(s) 616 permit communication of information between the computing device 610 and an external device. As an example, the external device can be embodied in or can comprise a sensor of the sensor(s) 208. As another example, the external device can be embodied in or can comprise another computing device, such as a network element (e.g., a service component of the service component(s) 244) or an end-user device. Such communication can include direct communication or indirect communication, such as exchange of information between the computing device 610 and the external device via a network or elements thereof. As illustrated, the I/O interface(s) 616 can comprise one or more of network adapter(s) 618, peripheral adapter(s) 622, and rendering unit(s) 626. Such adapter(s) can permit or facilitate connectivity between the external device and one or more of the processor(s) 612 or the memory 630. In one aspect, at least one of the network adapter(s) 618 can couple functionally the computing device 610 to one or more devices 670 via one or more traffic and signaling pipes 660 that can permit or facilitate exchange of traffic 662 and/or signaling 664 between the computing device 610 and the one or more devices 670. The device(s) contained in the one or more devices 670 can be an electronic component or an electromechanical component having suitable architecture (e.g., circuitry) for a specific functionality (computing, lighting, actuation, sensing, or the like). Such architecture can provide certain respective devices with computing functionality and associated computing resources (e.g., processor(s), memory devices(s), bus structure and related communication bandwidth). For other device(s) contained in the one or more devices 670, the architecture can provide nearly entirely analogic functionality.

Such network coupling provided at least in part by the at least one of the network adapter(s) 618 can be implemented in a wired environment, a wireless environment, or both. The information that is communicated by the at least one network adapter can result from the implementation of one or more operations in a method of the disclosure. Such output can be any form of visual representation, including, but not limited to textual, graphical, animation, audio, tactile, and the like. In certain embodiments, each of the device(s) 670 can have substantially the same architecture as the computing device 610.

The I/O interface(s) 616 can comprise rendering unit(s) 626 that can include functional elements (e.g., lights, such as light-emitting diodes; a display, such as liquid crystal display (LCD); combinations thereof; or the like) that can permit control of the operation of the computing device 610, or can permit conveying or revealing operational conditions of the computing device 610.

As described herein, the computing device 610 also includes a radio unit 614 that can permit the computing device 610 to communicate wirelessly with other devices (an IVI system, a meter or other type of monitor component, an RFID unit in a vehicle, or the like). The radio unit 614 can embody or can comprise the radio unit 344. In one embodiment, the radio unit 614 can comprise one or more antennas and a communication processing unit. In one embodiment, e.g. example embodiment 700 shown in FIG. 7, the radio unit 614 can comprise a set of one or more transmitters/receivers 706, and components therein (amplifiers, filters, etc.), functionally coupled to a multiplexer/demultiplexer (mux/demux) unit 708, a modulator/demodulator (mod/demod) unit 716 (also referred to as modem 716), and a coder/decoder unit 712 (also referred to as codec 712). Each of the transmitter(s)/receiver(s) 706 can form respective transceiver(s) that can transmit and receive wireless signals (e.g., electromagnetic radiation) via the one or more antennas 702.

Electronic components and associated circuitry, such as mux/demux unit 708, codec 712, and modem 716 can permit or facilitate processing and manipulation, e.g., coding/decoding, deciphering, and/or modulation/demodulation, of signal(s) received by the computing device 610 and signal(s) to be transmitted by such device. In one aspect, received and transmitted wireless signals can be modulated and/or coded, or otherwise processed, in accordance with one or more radio technology protocols (e.g., 3rd Generation Partnership Project (3GPP) Universal Mobile Telecommunication System (UMTS), 3GPP Long Term Evolution (LTE), or the like).

The electronic components in the described communication unit, including the one or more transmitters/receivers 706, can exchange information (e.g., data, metadata, code instructions, signaling and related payload data, combinations thereof, or the like) through a bus 714, which can embody or can comprise at least one of a system bus, an address bus, a data bus, a message bus, a reference link or interface, a combination thereof, or the like. Each of the one or more receivers/transmitters 706 can convert signal from analog to digital and vice versa. In addition or in the alternative, the receiver(s)/transmitter(s) 706 can divide a single data stream into multiple parallel data streams, or perform the reciprocal operation. Such operations may be conducted as part of various multiplexing schemes. As illustrated, the mux/demux unit 708 is functionally coupled to the one or more receivers/transmitters 704 and can permit processing of signals in time and frequency domain. In one aspect, the mux/demux unit 708 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), or space division multiplexing (SDM). In addition or in the alternative, in another aspect, the mux/demux unit 708 can scramble and spread information (e.g., codes) according to most any code, such as Hadamard-Walsh codes, Baker codes, Kasami codes, polyphase codes, and the like. The modem 716 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, the processor(s) 612 can permit the computing device 610 to process data (e.g., symbols, bits, or chips) for multiplexing/demultiplexing, modulation/demodulation (such as implementing direct and inverse fast Fourier transforms) selection of modulation rates, selection of data packet formats, interpacket times, and the like.

The codec 712 can operate on information (e.g., data, metadata, signaling, or a combination thereof) in accordance with one or more coding/decoding schemes suitable for communication, at least in part, through the one or more transceivers formed from respective transmitter(s)/receiver(s) 706. In one aspect, such coding/decoding schemes, or related procedure(s), can be retained as a group of one or more computer-accessible instructions (computer-readable instructions, computer-executable instructions, or a combination thereof) in memory 630. In a scenario in which wireless communication among the computing device 610 and another device (e.g., a device of the device(s) 670) utilizes multiple-input multiple-output (MIMO), multiple-input single-output (MISO), single-input multiple-output (SIMO) or single-input single-output (SISO) operation, the codec 712 can implement at least one of space-time block coding (STBC) and associated decoding, or space-frequency block coding (SFBC) coding and associated decoding. In addition or in the alternative, the codec 712 can extract information from data streams coded in accordance with a spatial multiplexing scheme. In one aspect, to decode received information (e.g. data, metadata, signaling, or a combination thereof), the codec 712 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 712 can utilize, at least in part, mux/demux unit component 708 and mod/demod component 716 to operate in accordance with aspects described herein.

The computing device 610 can operate in a variety of wireless environments having wireless signals conveyed in different electromagnetic radiation (EM) frequency bands. To at least such end, the radio unit 614 can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, or (ii) all or most unlicensed frequency bands currently available for telecommunication.

In the example embodiment 700, in certain implementations, one or more of the mux/demux unit 708, the modem 716, or the codec 712 can utilize or otherwise leverage at least one of the processor(s) to implement the communication processing functionality described herein. In one aspect, the at least one processor can execute one or more computer-accessible instruction retained in memory 630 in order to implement the communication processing functionality. In addition, in connection at least with wireless communication, the memory 630 or a memory element therein, such the functionality instructions storage 634 can be embodied in or can comprise a removable element, such as a subscriber identification module (SIM) card storage, a universal integrated circuit card (UICC) storage, or a removable user identity module (RUIM).

The computing device 610 also can include the bus 632, which represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card Industry Association (PCMCIA) bus, a Universal Serial Bus (USB) and the like. The bus 632, and all buses described herein, can be implemented over a wired or wireless network connection and each of the subsystems, including the processor(s) 612, the memory 630 and memory elements therein, and the I/O interface(s) 616 can be contained within one or more remote computing devices 670 at physically separate locations, connected through buses of this form, in effect implementing a fully distributed system.

The computing device 610 can comprise a variety of computer-readable media. Computer readable media can be any available media—transitory and non-transitory—that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 610, and can comprise, for example, both volatile and non-volatile media, and removable and/or non-removable media. In one aspect, the memory 630 can comprise computer-readable media in the form of volatile memory, such as random access memory (RAM), and/or non-volatile memory, such as read only memory (ROM).

The memory 630 can comprise functionality instructions storage 634 and functionality information storage 638. The functionality instructions storage 634 can comprise computer-accessible instructions that, in response to execution (by at least one of the processor(s) 612), can implement one or more of the functionalities of the disclosure. The computer-accessible instructions can embody or can comprise one or more software components illustrated as theme customization component(s) 636. In one scenario, execution of at least one component of the theme customization component(s) 636 can implement one or more of the example methods 1000 and 1100. For instance, such execution can cause a processor that executes the at least one component to carry out a disclosed example method. It should be appreciated that, in one aspect, a processor of the processor(s) 614 that executes at least one of the theme customization component(s) 636 can retrieve information from or retain information in a memory element 640 in the functionality information storage 638 in order to operate in accordance with the functionality programmed or otherwise configured by the theme customization component(s) 636. Such information can include at least one of code instructions, information structures, or the like. At least one of the one or more interfaces 650 (e.g., application programming interface(s)) can permit or facilitate communication of information between two or more components within the functionality instructions storage 634. The information that is communicated by the at least one interface can result from the implementation of one or more operations in a method of the disclosure. In certain embodiments, one or more of the functionality instructions storage 634 and the functionality information storage 638 can be embodied in or can comprise removable/non-removable, and/or volatile/non-volatile computer storage media.

At least a portion of at least one of the theme customization component(s) 636 or theme customization information 640 can program or otherwise configure one or more of the processors 612 to operate at least in accordance with the functionality described herein. In one embodiment, e.g., example embodiment 800 in FIG. 8, the theme customization component(s) 636 contained in the functionality instruction(s) storage 634 can include the exchange component 348, the theme composition component 310, the configuration component 320, and the utility component 330. It should be recognized that in such embodiment, hardware or firmware functional elements of the exchange component 348 can be embodied in suitable components of the computing device 610. In addition, in example embodiment 800, the functionality information storage 638 can comprise the customization storage 234. One or more of the processor(s) 612 can execute at least one of such components and utilize or otherwise leverage at least a portion of the information in the functionality information storage 638 in order to provide customization of a vehicle in accordance with one or more aspects described herein.

It should be appreciated that, in certain scenarios, the functionality instruction(s) storage 634 can embody or can comprise a computer-readable non-transitory storage medium having computer-accessible instructions that, in response to execution, cause at least one processor (e.g., one or more of processor(s) 612) to perform a group of operations comprising the operations or blocks described in connection with the disclosed methods.

In addition, the memory 630 can comprise computer-accessible instructions and information (e.g., data and/or metadata) that permit or facilitate operation and/or administration (e.g., upgrades, software installation, any other configuration, or the like) of the computing device 610. Accordingly, as illustrated, the memory 630 can comprise a memory element 642 (labeled operating system (OS) instruction(s) 642) that contains one or more program modules that embody or include one or more OSs, such as Windows operating system, Unix, Linux, Symbian. Android, Chromium, and substantially any OS suitable for mobile computing devices or tethered computing devices. In one aspect, the operational and/or architecture complexity of the computing device 610 can dictate a suitable OS. The memory 630 also comprises a system information storage 646 having data and/or metadata that permits or facilitate operation and/or administration of the computing device 610. Elements of the OS instruction(s) 642 and the system information storage 646 can be accessible or can be operated on by at least one of the processor(s) 612.

It should be recognized that while the functionality instructions storage 634 and other executable program components, such as the OS instruction(s) 942, are illustrated herein as discrete blocks, such software components can reside at various times in different memory components of the computing device 610, and can be executed by at least one of the processor(s) 612. In certain scenarios, an implementation of the theme customization component(s) 936 can be retained on or transmitted across some form of computer readable media.

The computing device 610 and/or one of the device(s) 670 can include a power supply (not shown), which can power up components or functional elements within such devices. The power supply can be a rechargeable power supply, e.g., a rechargeable battery, and it can include one or more transformers to achieve a power level suitable for operation of the computing device 610 and/or one of the device(s) 670, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 618) to connect operationally to the conventional power grid. In another aspect, the power supply can include an energy conversion component, such as a solar panel, to provide additional or alternative power resources or autonomy for the computing device 610 and/or one of the device(s) 670.

As described herein, the computing device 610 can operate in a networked environment by utilizing connections to one or more devices 670 which can be remotely located. As an illustration, a remote device can be a personal computer, a portable computer, a server, a router, a network computer, a peer device or other common network node, a sensor, a control component, an actuator, a transducer, a lighting fixture, a terminal display or any other display unit (such as a customizable surface), any combination of the foregoing, and so on. As described herein, connections (physical and/or logical) between the computing device 610 and a computing device of the one or more remote devices 670 can be made via one or more traffic and signaling pipes 660, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Figure 9:
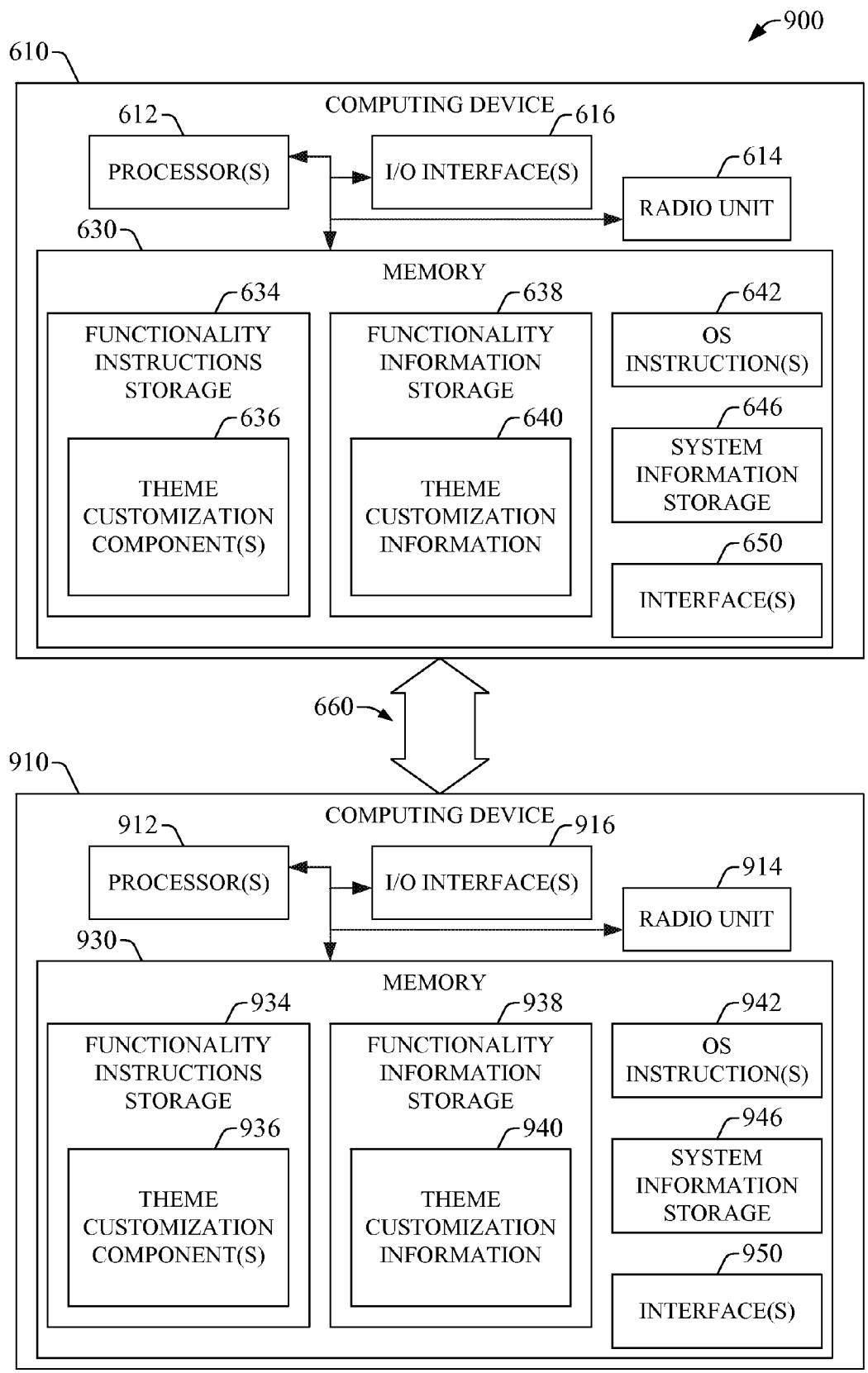

In one or more embodiments, such as example embodiment 900 shown in FIG. 9, one or more of the disclosed methods, for example, can be practiced in distributed computing environments (e.g., grid-based environments) where tasks can be performed by remote processing devices (at least one of device(s) 670) that are functionally coupled (e.g., communicatively linked or otherwise coupled) through a network having traffic and signaling pipes and related network elements. In a distributed computing environment, in one aspect, one or more software components (such as program modules) can be located in both a local computing device 610 and at least one remote computing device, such as computing device 910. As illustrated and described herein, the at least one remote computing device, e.g., computing device 910, can have substantially the same architecture and associated functionality as the computing device 610. For instance, the computing device 910 can comprise processor(s) 912, I/O interface(s) 916, radio unit 914, and a memory 930, where a bus architecture can couple functionally two or more of such elements. The radio unit 914 can have the same or similar architecture to that of the radio unit 614 (see, e.g., FIG. 7), and can operate in substantially the same manner as that described in connection with the radio unit 614. The memory 930 can comprise a functionality instructions storage 934 having one or more theme customization component(s) 936, and a functionality information storage 938 having theme customization information 940. The memory 930 also can comprise OS instruction(s) 942 and system information storage 946 that can permit, at least in part, operation and/or administration of the computing device 910. One or more internal programming interfaces 950 (represented as interface(s) 950 in FIG. 9) can permit or facilitate exchange of information between the theme customization component(s) 936 and the functionality information storage 938. In a scenario in which several components are present in the group of theme customization component(s) 936, at least one interface of the interface(s) 950 can permit or facilitate exchange of information between at least two of such components.

In one implementation, the computing device 610 can embody or can comprise the exchange component 348 and the theme composition component 310, whereas as the computing device 910 can comprise or can embody the configuration component 320 and the utility component 330, respectively. Other distributions of the exchange component 348, the theme composition component 310, the configuration component 320, and the utility component 330 can be implemented. Similarly, the customization storage 234 also can be distributed between the computing device 610 and the computing device 910 or other devices (such as dedicated storage or memory devices).

Figure 10:
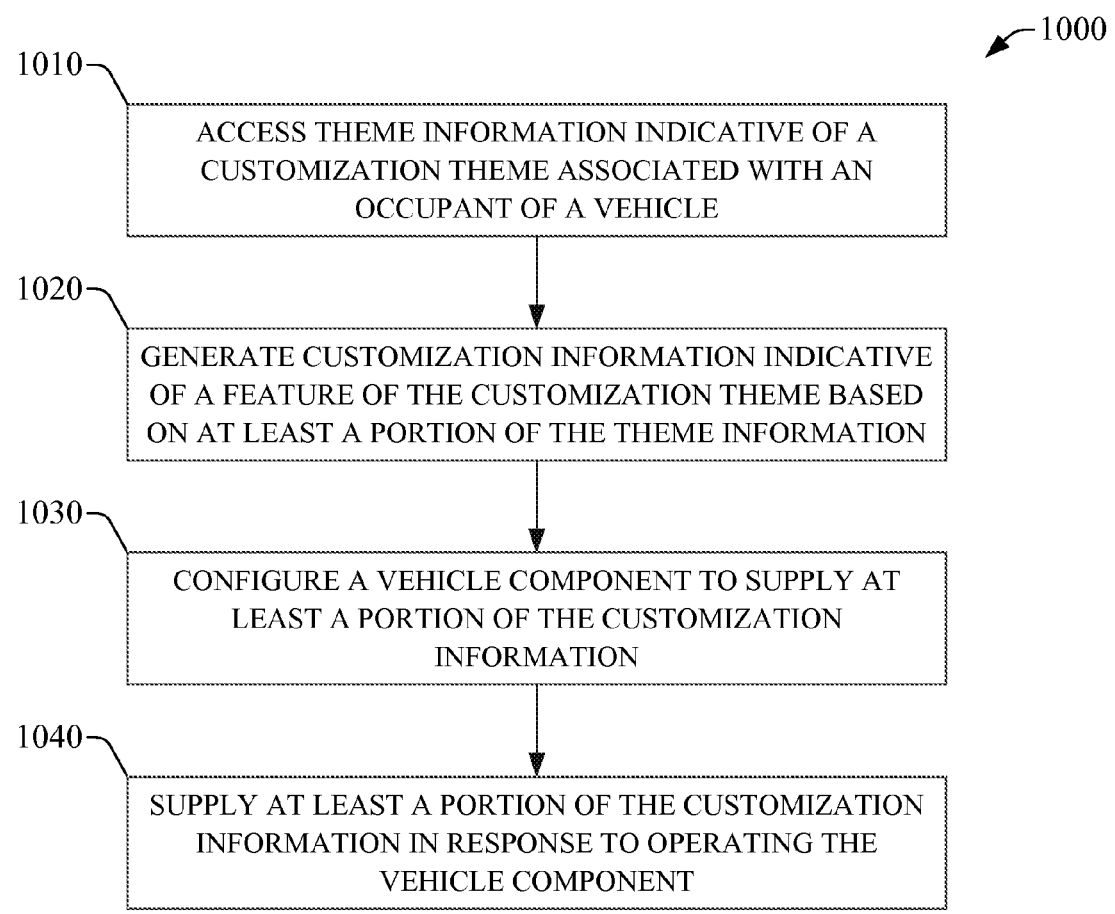
FIGS. 10-11 illustrate example methods in accordance with one or more aspects of the disclosure.
Figure 11:
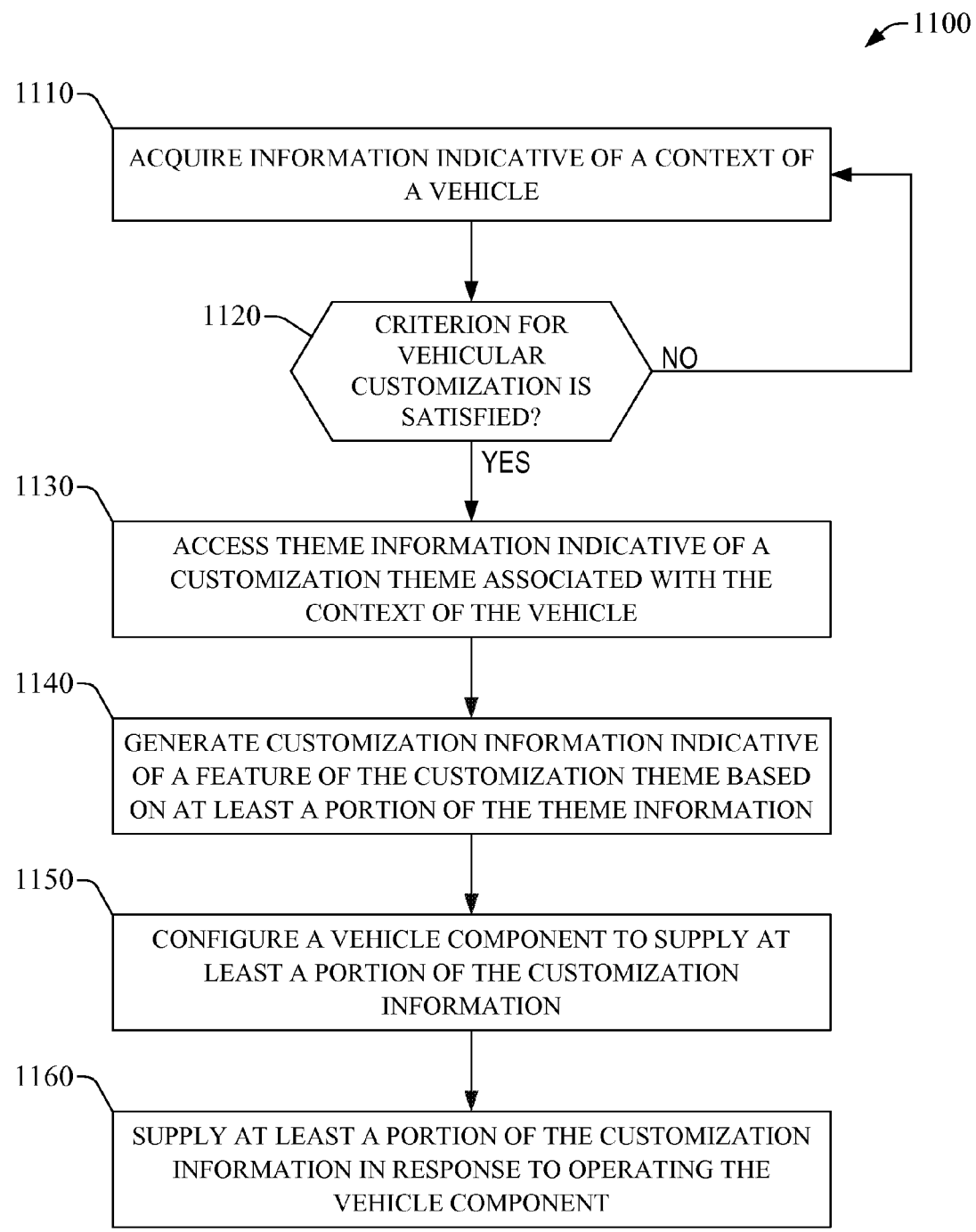

In view of the aspects described herein, example methods that can be implemented in accordance with the disclosure can be better appreciated with reference to the flowchart in FIGS. 10-11. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods of the disclosure can be retained on an article of manufacture, or computer-readable medium, to permit or facilitate transporting and transferring such methods to a computing device (e.g., a desktop computer; a mobile computer, such as a tablet computer, or a smartphone; a gaming console; a mobile telephone; a blade computer; a programmable logic controller; and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 10 illustrates a flowchart of an example method 1000 for customizing a vehicle in accordance with at least certain aspects of the disclosure. One or more computing devices having at least one processor or being functionally coupled to at least one processor can implement (e.g. compile, execute, compile and execute, etc.) one or more blocks of the subject example method 1000. In other scenarios, one or more blocks of the example method 1000 can be implemented in a distributed fashion by two or more computing devices contained in a system. Each of the two or more computing devices can have at least one processor or can be functionally coupled to at least one processor, where such processor(s) can implement at least one of the one or more blocks. At block 1010, theme information indicative of a customization theme, such as a personal theme, associated with an occupant of the vehicle is accessed. As described herein, the occupant of the vehicle can be an operator of the vehicle or a passenger of the vehicle. Block 1010 can be referred to as an accessing operation and, in one aspect, can comprise accessing information indicative of a location associated with the customization theme. The location can be one of a tagged location or an untagged location. In another aspect, the accessing operation can comprise accessing information indicative of scheduling information (e.g., an electronic calendar) associated with the operator of the vehicle. In another aspect, the accessing operation can comprise accessing information indicative of an occupant of an additional vehicle (e.g., vehicle 150), where the occupant of the additional vehicle can be associated with the customization theme.

At block 1020, customization information indicative of a feature of the customization theme (e.g., the personal theme or the corporate theme) is generated based on at least a portion of the theme information. Block 1020 can be referred to as a generating operation and, in one aspect, can comprise subscribing to a content service that can supply media assets and/or messaging content, such as MMS communications, SMS communication, or the like. As described herein, in certain embodiments, the content service can be provided in a distributed fashion via one or more networked service components functionally coupled to a repository. In addition or in the alternative, the generating operation can comprise receiving information indicative of the feature of the customization theme from the content service. In one implementation, the feature of the customization theme can comprise one or more of a feature of a recreational category, a feature of an educational category, or a feature of an administrative category feature. As described herein, the recreational category can comprise one or more of a gaming category, a shopping category, a dining category, a music-venue category, or an arts category. The administrative category can comprise a scheduling category. It should be appreciated that the feature of the customization theme is not restricted to being a feature of the foregoing categories, and substantially any category that can be devised by a vehicle occupant or a third-party theme developer is contemplated. These categories can be referred to as theme categories.

In certain implementations, the generating operation can comprise inferring content associated with the feature of the customization theme. In addition or in the alternative, as described herein, the generating operation can comprise subscribing to a content service (e.g., one of the service(s) 170) having the content that is inferred to be pertinent to the customization theme. In other implementations, the generating operation can comprise receiving content associated with the customization theme from an authorized remote device and persisting (e.g., storing and making available) at least a portion of the content. At least the portion of the content can be persisted in customization storage (e.g., customization storage 234) or any other repository or memory device integrated into or functionally coupled to a computing device that implements at least a portion of the subject example method 1000. As described herein, the customization theme can be or can comprise one of a gaming theme, a shopping theme, a recreational theme (such as a holiday or seasonal theme, a sports theme, an adventure theme), a family theme, a business theme, a religious theme, any combination thereof, or the like. Yet, it should be appreciated that the scope of the customization theme (e.g., a personal theme or a corporate theme) can be unconstrained and can comprise any information devised by a vehicle occupant, an organization or corporation, or a third-party theme developer of the customization theme.

In scenarios in which location information is accessed as part of acquiring information indicative of a customization theme, the generating operation can comprise generating a satisfactory route from a current location of the vehicle to the location associated with the customization theme. A satisfactory route can be an optimal route or a nearly-optimal route.

At block 1030, a vehicle component is configured to supply at least a portion of the customization information. Block 1030 can be referred to as a configuring operation and, in one aspect, can comprise configuring one or more of an audio component, a display component, a temperature control component, a navigation component, a lighting fixture, a seat-firmness control component, a speed control component, a speed monitoring component, an acceleration control component, an acceleration monitoring component, a breaking control component, or a safety component. In another aspect, the configuring operation can comprise transmitting, to the vehicle component, one or more instructions that, in response to execution, cause the vehicle component to restrain at least one of speed of the vehicle, acceleration of the vehicle, or an inter-vehicle distance associated with the vehicle according at least in part to the portion of the customization information. As described herein, the instructions can be computer-readable computer-executable instructions.

At block 1040, at least a portion of the customization information is supplied in response to operating the vehicle component. Block 1040 can be referred to as a supplying operation and, in one aspect, can comprise rendering at least the portion of the customization information. In another aspect, the supplying operation can comprise rendering information indicative of a threshold that restrains at least one of speed of the vehicle, acceleration of the vehicle, or an inter-vehicle distance associated with the vehicle according at least in part to the portion of the customization information. As described herein, in certain scenarios, one or more of such thresholds can defined or otherwise configured based at least on an occupant of the vehicle that is being customized. In certain embodiments, such thresholds can be persisted (e.g., stored and made available) in a repository, a memory device, or customization storage (e.g., customization storage 234).

FIG. 11 presents a flowchart of an example of method 1100 for dynamic vehicle customization in accordance with one or more aspects of the disclosure. A computing device that can implement the example method 1000 also can implement one or more blocks of the subject example method 1100. At block 1110, information indicative of a context of a vehicle is acquired (received, decoded, received and decoded, or the like). In one aspect, the context can be referred to as vehicular context and can include time of day, day of the week, special occasion (e.g. birthday or anniversary), a specific event, a combination thereof, or the like. The information indicative of the context can be acquired. At block 1120 it is determined if a criterion for vehicular customization is fulfilled. In one aspect, a criterion for vehicular customization criterion can comprise one or more of occurrences of a specific event (e.g., a sports team victory, a job promotion, a birthday, and the like), specific instants (e.g., such as time of day, time of week, and the like), presence of a specific occupant (owner, child of owner, sibling of owner, etc.) or combination of occupants (mother and child, husband and wife, child and parent) within the vehicle 104. In the negative case, flow is directed to block 1110. Yet, in a scenario in which it is ascertained that the criterion for vehicular customization is satisfied, the flow is directed to block 1130, at which theme information indicative of a customization theme associated with the context of the vehicle (e.g., vehicle 104) is accessed. At block 1140, customization information indicative of a feature of the customization theme is generated based at least on a portion of the theme information. At block 1150, a vehicle component is configured to supply at least a portion of the customization information. At block 1160, at least a portion of the customization information is supplied in response to operating the vehicle component.

It should be appreciated that blocks 1130-1160 are similar to blocks 1010-1040 and can be implemented in accordance therewith as described herein. It should also be appreciated that implementation of blocks 1130-1160 can customize the vehicle in response to a specific context. In certain scenarios, customization in response to fulfillment of a criterion for vehicular customization can comprise switching from a first customization theme to a second customization theme. For instance, customization according to nature theme can contemplate switching among four different themes associated with the seasons of the year. In other scenarios, such a customization can comprise switching features within a customization theme, such as reconfiguring certain elements of the customization theme, e.g., information objects, such as data structures, and rendering thereof, or enabling or disabling of certain functionality, such as reception of communications (e.g., MMS communication. SMS communication, and the like). For example, the theme "It's Friday after work" can have specific features on the birthday or an anniversary of an occupant of the vehicle.

Various advantages of the disclosure over conventional technologies for vehicle customization emerge from the present specification and annexed drawings. One example advantage may be the creation of digital customizations that can provide a substantially richer, more holistic and connected experience with sources of customization. Implementation of a customization theme can provide, for example, information associated with the theme. Similarly, implementation of a customization theme can cause or otherwise facilitate connectivity with remote relatives. For instance, as described herein, implementation of a customization theme may permit to render messages or other content received from a remote relative. Another example advantage may be the dynamic aspect of digital customizations, which can be implemented in response to specific context or events, for example. Yet another example advantage may be that the vehicular customizations described herein can permit a vehicle to be re-customized without a need to change or replace some or all physical artifacts that typically are utilized to customize a vehicle.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g. methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "platform," "system," "architecture," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that provides, at least in part, the functionality of the electronic components. An interface can include input/output (I/O) components as well as associated processor, application, and/or other programming components. The terms "component," "environment," "platform," "system," "architecture," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide a customization of a vehicle. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method for vehicle customization, comprising:
accessing, at a computing platform having at least one processor and a first in-vehicle infotainment (IVI) system, theme information indicative of a customization theme to be associated with an occupant of a vehicle, wherein the occupant to be either a driver or a passenger of the vehicle;
detecting, at the computing platform, one or more venues at a location proximate and external to the vehicle associated with the customization theme based on data received from a sensor in the vehicle, including detecting one or more occupants of another vehicle using a second IVI system, wherein the one or more occupants are associated with the customization theme;
generating, at the computing platform, customization information indicative of a feature of the customization theme based on at least in part on the one or more venues;
configuring, at the computing platform, a vehicle component to provide at least a portion of the customization theme.

2. The method of claim 1, further comprising supplying at least the portion of the customization information in response to operating the vehicle component.

3. The method of claim 2, wherein the supplying comprises rendering at least the portion of the customization information.

4. The method of claim 2, wherein the supplying comprises rendering information indicative of a threshold that restrains at least one of speed of the vehicle, acceleration of the vehicle, or an inter-vehicle distance associated with the vehicle according at least in part to the portion of the customization information.

5. The method of claim 1, wherein the accessing comprises accessing information indicative of a location associated with the customization theme, wherein the location is one of a tagged location or an untagged location.

6. The method of claim 1, wherein the accessing comprises accessing information indicative of scheduling information associated with the occupant of the vehicle.

7. The method of claim 1, wherein the accessing comprises accessing information indicative of an occupant of an additional vehicle, the occupant of the additional vehicle is associated with the customization theme.

8. The method of claim 1, wherein the configuring comprises configuring one or more of an audio component, a display component, a temperature control component, a navigation component, a lighting fixture, a seat-firmness control component, a speed control component, a speed monitoring component, an acceleration control component, an acceleration monitoring component, a breaking control component, or a safety component.

9. The method of claim 1, wherein the configuring comprises transmitting, to the vehicle component, one or more instructions that, in response to execution, cause the vehicle component to restrain at least one of speed of the vehicle, acceleration of the vehicle, or an inter-vehicle distance associated with the vehicle according at least in part to the portion of the customization information.

10. The method of claim 1, wherein the generating comprises subscribing to a content service, and receiving information indicative of the feature of the customization theme from the content service, and wherein the feature of the customization theme comprises a feature of a theme category.

11. The method of claim 1, wherein the generating comprises inferring content associated with the feature of the customization theme, and subscribing to a content service having the content that is inferred.

12. The method of claim 1, wherein the generating comprises receiving content associated with the customization theme from an authorized remote device and, persisting at least a portion of the content.

13. The method of claim 5, wherein the generating comprises generating a satisfactory route from a current location of the vehicle to the location associated with the customization theme.

14. A system for vehicle customization including a first in-vehicle infotainment (IVI) system, comprising:
    at least one memory device having computer-executable instructions encoded thereon; and
    at least one processor functionally coupled to a memory device of the at least one memory device and configured, by at least a portion of the computer executable instructions,
        to access theme information indicative of a customization theme to be associated with an occupant of a vehicle, wherein the occupant to be either a driver or a passenger of the vehicle;
        to detect one or more venues at a location proximate and external to the vehicle associated with the customization theme based on data received from a sensor in the vehicle, including detecting one or more occupants of another vehicle using a second IVI system, wherein the one or more occupants are associated with the customization theme;
        to generate customization information indicative of a feature of the customization theme based on at least in part on the one or more venues;
        to configure a vehicle component to provide at least a portion of the customization theme; and
        to provide at least the portion of the customization information in response to operating the vehicle component.

15. The system of claim 14, wherein the at least one processor is further configured to render at least the portion of the customization information.

16. The system of claim 14, wherein the at least one processor is further configured to render information indicative of a threshold that restrains at least one of speed of the vehicle, acceleration of the vehicle, or an inter-vehicle distance associated with the vehicle according at least in part to the portion of the customization information.

17. The system of claim 14, wherein the at least one processor is further configured to access information indicative of a location associated with the customization theme, wherein the location is one of a tagged location or an untagged location.

18. The system of claim 14, wherein the at least one processor is configured to access information indicative of an occupant of an additional vehicle, the occupant of the additional vehicle is associated with the customization theme.

19. The system of claim 14, wherein the at least one processor is further configured to program one or more of an audio component, a display component, a temperature control component, a navigation component, a lighting fixture, a seat-firmness control component, a speed control component, a speed monitoring component, an acceleration control component, an acceleration monitoring component, a breaking control component, or a safety component.

20. The system of claim 14, wherein the at least one processor is further configured to transmit, to the vehicle component, one or more instructions that, in response to execution, cause the vehicle component to restrain at least one of speed of the vehicle, acceleration of the vehicle, or an inter-vehicle distance associated with the vehicle according at least in part to the portion of the customization information.

21. The system of claim 14, wherein the at least one processor is further comprised to subscribe to a content service, and to receive information indicative of the feature of the customization theme from the content service, and wherein the feature of the customization theme comprises a feature of a theme category.

22. The system of claim 14, wherein the at least one processor is further configured to infer content associated with the feature of the customization theme, and subscribing to a content service having the content that is inferred.

23. The system of claim 14, wherein the at least one processor is further configured to receive content associated with the customization theme from an authorized remote device, and to persist at least a portion of the content.

24. The system of claim 17, wherein the at least one processor is further configured to generate a satisfactory route from a current location of the vehicle to the location associated with the customization theme.

25. A method for vehicle customization, comprising:
    acquiring, at a computing system comprising at least one processor and a first in-vehicle infotainment (IVI) system, information indicative of a context of a vehicle;
    determining, at the computing system, if a criterion for vehicular customization is satisfied; and
    in response to ascertaining that the criterion for vehicular customization is satisfied, performing operations comprising:
        accessing, at the computing system, theme information indicative of a customization theme to be associated with the context of the vehicle, wherein the context of the vehicle to be associated with either a driver or an occupant of the vehicle,
        detecting one or more venues at a location proximate and external to the vehicle associated with the customization theme based on data received from a sensor in the vehicle, including detecting one or more occupants of another vehicle using a second IVI system, wherein the one or more occupants are associated with the customization theme;
        generating, at the computing system, customization information indicative of a feature of the customization theme based at least on the one or more venues and the context of the vehicle,
        configuring a vehicle component to provide at least a portion of the customization theme, and
        providing at least a portion of the customization information in response to operating the vehicle component.

26. The method of claim 25, wherein the configuring comprises configuring one or more of an audio component, a display component, a temperature control component, a navigation component, a lighting fixture, a seat-firmness control component, a speed control component, a speed monitoring component, an acceleration control component, an acceleration monitoring component, a breaking control component, or a safety component.

27. The method of claim 25, wherein the configuring comprises transmitting, to the vehicle component, one or more instructions that, in response to execution, cause the vehicle component to restrain at least one of speed of the vehicle, acceleration of the vehicle, or an inter-vehicle distance associated with the vehicle according at least in part to the portion of the customization information.

28. A computer-readable non-transitory medium encoded with computer-accessible instructions that, in response to execution, cause at least one processor to perform acts comprising:

accessing, at a computing platform having at least one processor and a first in-vehicle infotainment (IVI) system, theme information indicative of a customization theme to be associated with an occupant of a vehicle, wherein the occupant to be either a driver or a passenger of the vehicle;

detecting, at the computing platform, one or more venues at a location proximate and external to the vehicle associated with the customization theme based on data received from a sensor in the vehicle, including detecting one or more occupants of another vehicle using another IVI system, wherein the one or more occupants are associated with the customization theme;

generating, at the computing platform, customization information indicative of a feature of the customization theme based on at least in part on the one or more venues; and configuring, at the computing platform, a vehicle component to provide at least a portion of the customization theme.

29. The computer-readable non-transitory medium of claim 28, further comprising supplying at least the portion of the customization information in response to operating the vehicle component.

30. The computer-readable non-transitory medium of claim 29, wherein the supplying comprises rendering at least the portion of the customization information.

31. The computer-readable non-transitory medium of claim 29, wherein the supplying comprises rendering information indicative of a threshold that restrains at least one of speed of the vehicle, acceleration of the vehicle, or an inter-vehicle distance associated with the vehicle according at least in part to the portion of the customization information.

32. The computer-readable non-transitory medium of claim 28, wherein the accessing comprises accessing information indicative of a location associated with the customization theme, wherein the location is one of a tagged location or an untagged location.

33. The computer-readable non-transitory medium of claim 28, wherein the accessing comprises accessing information indicative of scheduling information associated with the operator of the vehicle.

34. The computer-readable non-transitory medium of claim 28, wherein the accessing comprises accessing information indicative of an occupant of an additional vehicle, the occupant of the additional vehicle is associated with the customization theme.

35. The computer-readable non-transitory medium of claim 28, wherein the configuring comprises configuring one or more of an audio component, a display component, a temperature control component, a navigation component, a lighting fixture, a seat-firmness control component, a speed control component, a speed monitoring component, an acceleration control component, an acceleration monitoring component, a breaking control component, or a safety component.

36. The computer-readable non-transitory medium of claim 28, wherein the configuring comprises transmitting, to the vehicle component, one or more instructions that, in response to execution, cause the vehicle component to restrain at least one of speed of the vehicle, acceleration of the vehicle, or an inter-vehicle distance associated with the vehicle according at least in part to the portion of the customization information.

37. The computer-readable non-transitory medium of claim 28, wherein the generating comprises subscribing to a content service, and receiving information indicative of the feature of the customization theme from the content service, and wherein the feature of the customization theme comprises a feature of a theme category.

38. The computer-readable non-transitory medium of claim 28, wherein the generating comprises inferring content associated with the feature of the customization theme, and subscribing to a content service having the content that is inferred.

39. The computer-readable non-transitory medium of claim 28, wherein the generating comprises receiving content associated with the customization theme from an authorized remote device and, persisting at least a portion of the content.

40. The computer-readable non-transitory medium of claim 32, wherein the generating comprises generating a satisfactory route from a current location of the vehicle to the location associated with the customization theme.

* * * * *